United States Patent
Almy et al.

(10) Patent No.: US 11,828,034 B2
(45) Date of Patent: Nov. 28, 2023

(54) SYSTEMS, METHODS, AND MACHINES FOR IMPROVED SITE LAYOUT AND FOUNDATION ALIGNMENT

(71) Applicant: Ojjo, Inc., San Rafael, CA (US)

(72) Inventors: Charles Almy, Berekely, CA (US); Steven Kraft, Albany, CA (US); Jack West, San Rafael, CA (US); Trevor Guthrie, Santa Rosa, CA (US)

(73) Assignee: Ojjo, Inc., San Rafael, CA (US)

( * ) Notice: Subject to any disclaimer, the term of this patent is extended or adjusted under 35 U.S.C. 154(b) by 223 days.

(21) Appl. No.: 17/073,177

(22) Filed: Oct. 16, 2020

(65) Prior Publication Data

US 2021/0115642 A1    Apr. 22, 2021

Related U.S. Application Data

(60) Provisional application No. 62/937,957, filed on Nov. 20, 2019, provisional application No. 62/915,789, filed on Oct. 16, 2019.

(51) Int. Cl.
*E02D 13/04*    (2006.01)
*E02D 7/06*    (2006.01)

(52) U.S. Cl.
CPC ............... *E02D 13/04* (2013.01); *E02D 7/06* (2013.01); *E02D 2600/10* (2013.01)

(58) Field of Classification Search
CPC ........ F24S 25/617; E02D 13/00; E02D 13/04; E02D 7/06; E02D 7/14; E02D 7/22; E02D 7/26; E02D 5/56; E02D 5/801
See application file for complete search history.

(56) References Cited

U.S. PATENT DOCUMENTS

| | | | | |
|---|---|---|---|---|
| 4,907,915 A | * | 3/1990 | Nicholson | ............... E02D 7/16 405/303 |
| 10,310,054 B2 | * | 6/2019 | Troy | ........................ G01S 5/16 |

(Continued)

FOREIGN PATENT DOCUMENTS

| | | |
|---|---|---|
| JP | 2013249616 A | 12/2013 |
| WO | 2015166855 A1 | 11/2015 |

OTHER PUBLICATIONS

International Search Report for PCT/US2020056178 dated Jan. 26, 2021.

*Primary Examiner* — Sean D Andrish
(74) *Attorney, Agent, or Firm* — Phillip D. Mancini

(57) ABSTRACT

Systems and methods are provided for performing site preparation work when building a single-axis tracker solar power plant. An installation and assembly machine is outfitted with a positioning system. At the time of installation, a reference laser is located at one end of an intended tracker row and is aligned positionally with an intended axis of rotation of the tracker (e.g., the tracker torque tube). The machine is moved to the first desired installation location based on the positioning information so that the laser beam impinges on a target on the machine. The distance between the laser and target is measured. A portion of the machine containing the target is moved with respect to the beam until the measured distance is equal to a predetermined distance. Once the correct distance is confirmed, the portion of the machine containing the target may be moved to confirm that the machine mast is oriented correctly in other axes including Y, Z and yaw.

20 Claims, 14 Drawing Sheets

(56) References Cited

U.S. PATENT DOCUMENTS

| | | |
|---|---|---|
| 2012/0148349 A1 | 6/2012 | Grover |
| 2015/0233076 A1 | 8/2015 | Montgomery et al. |
| 2015/0288325 A1 | 10/2015 | Paponneau |

* cited by examiner

A<B<C

A>B>C

A=B=C

US 11,828,034 B2

SYSTEMS, METHODS, AND MACHINES FOR IMPROVED SITE LAYOUT AND FOUNDATION ALIGNMENT

CROSS-REFERENCE TO RELATED APPLICATIONS

This claims priority to U.S. provisional patent application No. 62/937,957 filed on Nov. 20, 2019, titled "SYSTEMS, METHODS AND MACHINES FOR IMPROVED FOUNDATION ALIGNMENT, and 62/915,789 filed on Oct. 16, 2019, titled "SYSTEMS, METHODS, AND MACHINES FOR IMPROVED SOLAR TRACKER FOUNDATION INSTALLATION, the disclosures of which are hereby incorporated by reference in their entirety.

BACKGROUND

Single-axis trackers are rapidly becoming the form factor of choice for solar power plant developers. These structures consist of North-South oriented rows of solar panels oriented on a common rotational axis to move together from an East-Facing to a West-Facing orientation to follow the sun's Westerly path each day. Keeping the panels facing the sun increases energy harvest relative to fixed-tilt arrays that do not move.

After removal of debris, rocks and other site preparation is performed, the first step towards construction of a large-scale solar array is performing a site survey. The site survey is usually done with a particular tracker maker's equipment in mind because the equipment will, to some extent, dictate the layout (i.e., row length, inter-row spacing, trenching, etc.). At the end of the survey, a plan is created that shows the location of the ends of each row as well as the position of each ground penetrating foundation component and any required trenches for running cables across the array. Since the row length and foundation-to-foundation distance is known for each tracker maker, survey costs could be reduced if the machine installing foundations was able to determine where it was along the X (North-South) axis with sufficient accuracy. To that end, the various embodiments, provide systems, methods, and machines for accurately installing foundation components without survey markers.

Moreover, the same technology that enables installation machines to orient to the correct location to drive foundation components may also be used to automate and improve the alignment when driving foundation components. In particular when H-pile foundations are used, it is not uncommon for a second construction crew to come in after H-piles have been driven but prior to tracker assembly to mitigate misaligned piles. Although cycle time between consecutive foundations is often touted as a reliable cost metric for solar foundation costs this metric ignores the additional cost in time delays and man hours incurred remediate poorly aligned foundation components after they have been driven. In recognition of this problem, and to further leverage the technology that simplifies and/or eliminates pre-construction, various embodiments of the present disclosure use one or more range finding lasers and corresponding automated control systems to orient the mast of the foundation component driving machine in pitch, yaw, and X, thereby improving the alignment of driven components, reducing, and ideally eliminating the need for foundation mitigation.

BRIEF SUMMARY OF THE INVENTION

The various embodiments of the invention relate to systems and methods for performing site lay out for a single-axis tracker solar power plant that uses geo positioning at the installation and assembly machine rather than a site survey with marking pins at each location to determine where to install foundation components to support the tracker. Reference points are located at each end of a desired tracker row. Then, a laser beam is projected from end of the row onto a target assembly on the installation and assembly machine. The machine is adjusted in a first direction to align the beam with the target. The distance between the target and the machine is measured during or after the adjustment. If the distance changes, the machine knows that orientation in one or more axes is off (e.g., X—the direction of the row, typically runs North-South, Y—the direction orthogonal to the row, typically East-West, Z, the height above the ground along a plumb axis, or yaw—measures perpendicularity of the target plate to the beam). In various embodiments, the attitude of the machine, and by extension the target, may be adjusted in response to detecting a difference in the calculated distance value. The process may be repeated until the measured value remains constant when the portion of the machine is adjusted.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1:
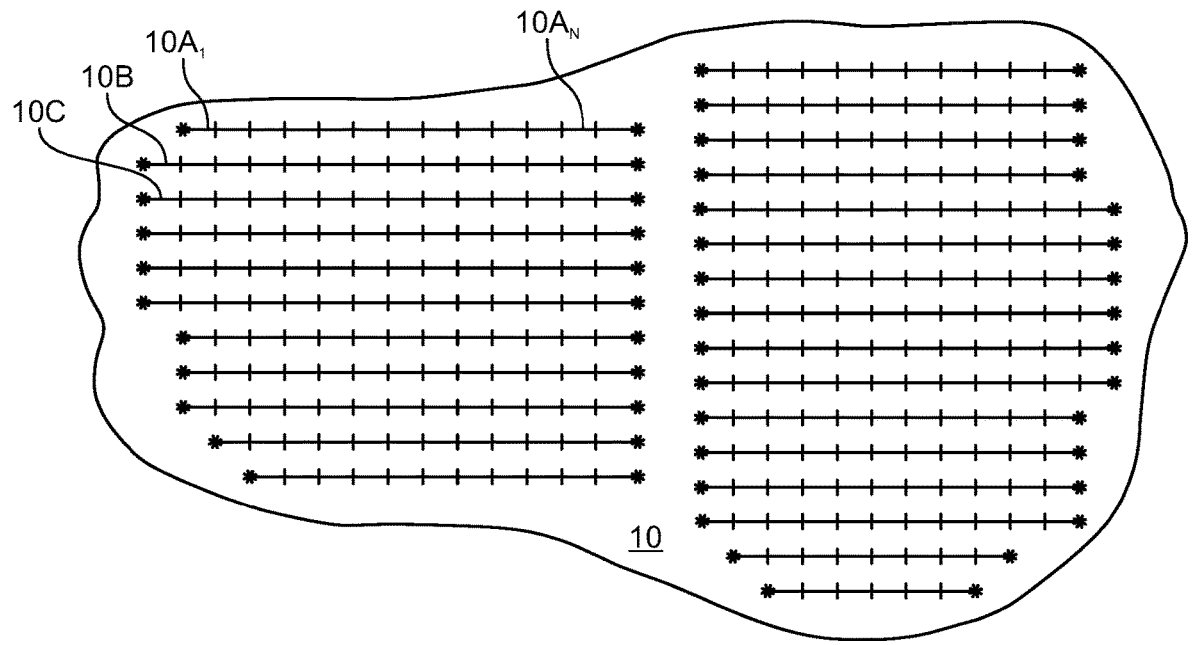
FIG. 1 shows a portion of a conventional single-axis tracker array site after a site survey has been performed.

Turning now to the drawing figures, FIG. 1 shows a portion of a single-axis tracker array site. Site 10 shown in the figure is in a pre-construction state of construction. A site survey has been performed to layout rows of the array corresponding to a particular tracker maker's requirements for row length, foundation spacing, motor locations and inter-row spacing, among other constraints, including a marker placed at each required foundation location. Each row is designated by 10A-N where N is a letter and each survey spot in the row is designated by subscript 1-N where N is an integer. According to this naming convention, row one includes points $10A_{1-N}$. Typically, one or more flags or other markers are placed in the ground at each survey point to indicate to the foundation installation crew exactly where to drive foundation components. After foundations are complete, electrical work and tracker construction may begin. This work is dictated by the location of the in-ground foundation components.

Figure 2:
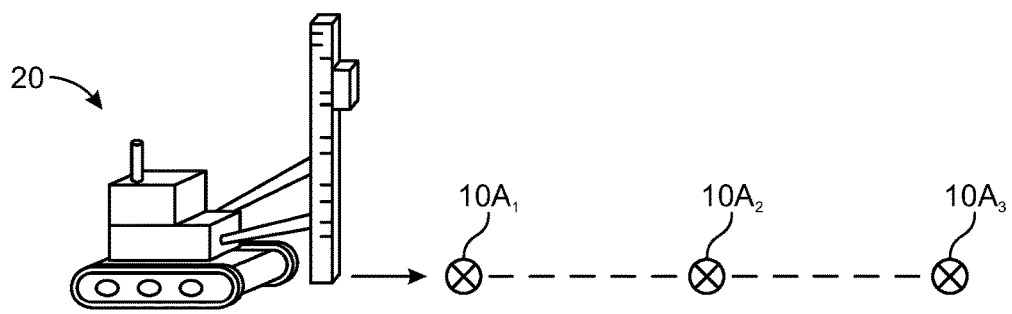
FIG. 2 shows a prior art solar pile driving machine installing H-piles along one of the rows of the array site of FIG. 1.

FIG. 2 shows machine 20 usable to install tracker foundations traveling down a row of a site like that shown in FIG. 1. Until recently, single-axis trackers were predominantly supported by driven H-piles. H-piles are elongated W6×9 or W6×12 galvanized steel beams that are driven into the ground at a plumb orientation with a solar pile driving machine. The solar pile driving machine is typically a tracked chassis with a diesel-powered hydraulic system that powers a hammer, vibratory hammer or other device that beats on the head of the pile or on a protective jig to incrementally drive the beam into the ground. Driven H-piles are seen, for example in FIG. 8A.

The applicant of this disclosure has developed an alternative to H-pile foundations to support single-axis trackers, fixed-tilt arrays and other structures known commercially as EARTH TRUSS. The EARTH TRUSS foundation system reduces the amount of steel used to support an array relative to H-piles because by using a truss geometry to translates lateral wind loads into axial forces of tension and compression rather than bending moments. This enables less steel to be used to support the same sized loads and shallower embedment depths for below-ground foundation components. The EARTH TRUSS is an A-frame-shaped truss anchored in the ground that is made from a pair of opposing legs angled towards each other to straddle the intended North-South tracker row. A so-called truss cap, adapter, or bearing adapter is used to connect the free ends of each adjacent leg and in some cases provides a bearing or bearing support for the tracker system. Each leg is a two-piece structure made of a screw anchor and an upper portion extending along a substantially common axis.

Figure 9:
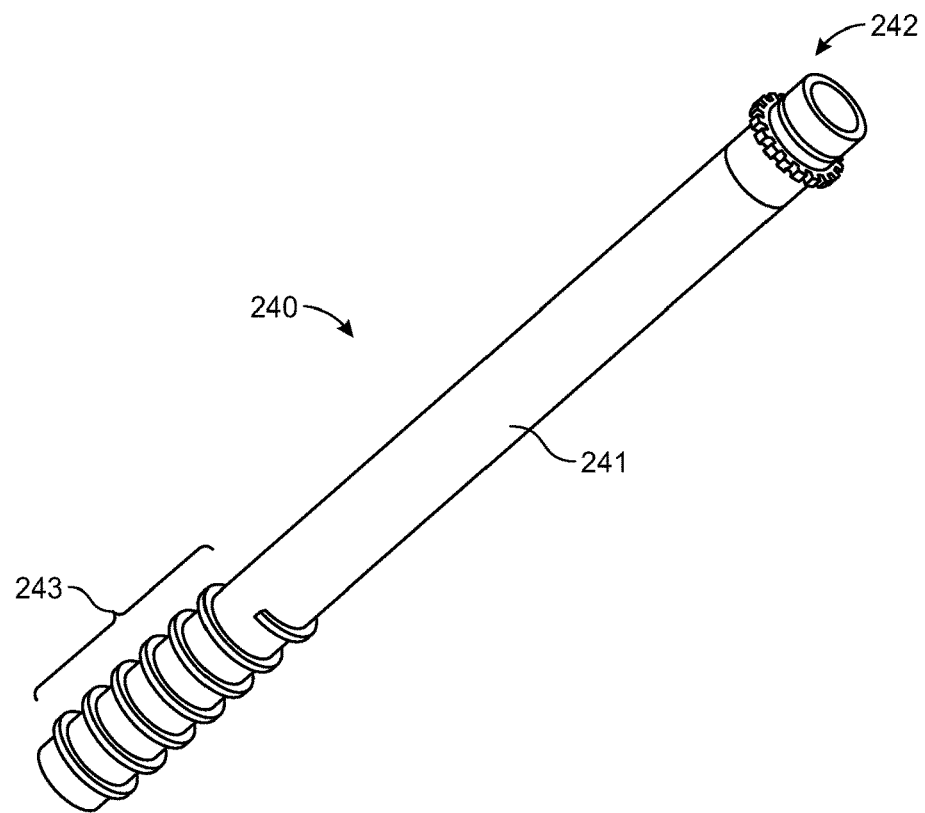
FIG. 9 is a screw anchor component of an EARTH TRUSS foundation according to various embodiments of the invention.
Figure 10:
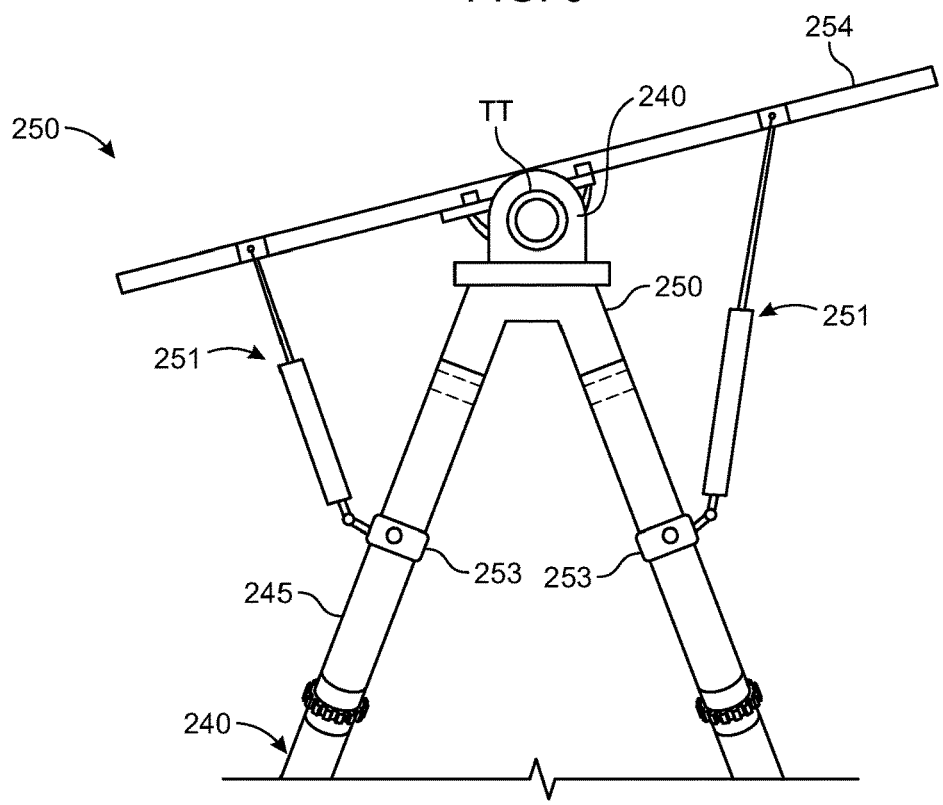
FIG. 10 is an EARTH TRUSS foundation supporting a portion of a single-axis tracker according to various embodiments of the invention.

The EARTH TRUSS foundation system is shown, for example, in FIGS. 9 and 10. Starting with FIG. 9, this figure shows screw anchor 240. The screw anchor is the base component of this system. As shown, screw anchor 240 consists of an elongated member having hollow tubular body 241 with driving coupler 242 at the upper end and external thread form 243 at the lower end. Screw anchor 240 is installed by driving it into the ground to a desired embedment depth with a combination of downforce and torque. Driving coupler 242 has features engaged by the chuck of a rotary driver as well as a connecting portion that is received in the open end of an upper leg section. Because anchor 240 is open at both ends, a drill, mandrel or other tool can be manipulated through it while it is being driven to facilitate embedment in difficult soils and even in rock.

FIG. 10 shows an assembled EARTH TRUSS foundation supporting a torque tube bearing of a single-axis tracker. In this case, the tracker is a conventional style tracker. In such a tracker, the torque tube (labeled "TT" in the figure) is powered to rotate about its own axis within each bearing. In other tracker systems, such as so-called "mechanically balanced" single-axis trackers, the torque tube is suspended from a bearing pin supported by an upside-down U-shaped bearing housing adapter. The drive motor is offset from the torque tube and instead aligned with the bearing pin so that the torque tube swings through an arc bounded on each side by the vertical portions of the bearing housing adapter. The various embodiments of the invention are agnostic as to the type of tracker the foundation will support.

With specific regard to EARTH TRUSS foundations, these are constructed by driving adjacent screw anchors 240 into underlying ground along the intended North-South running tracker row. After adjacent screw anchors 240 are driven to depth, truss cap or adapter 255 is held in place at the correct position by a jig on the mast and upper legs sections 245 are loosely sleeved over each coupler 242 and connecting portions of truss cap 255. In the example of FIG. 10, the portion of each upper leg section 245 overlapping with its respective screw anchor 240 and with truss cap 255 are crimped to lock them in place, however, it should be appreciated that other mechanisms of joining the components are also possible. In the example of FIG. 10, dampers 251 have attached to each leg via a damper leg bracket 253. The other end of each damper is attached to a purlin or other bracket 254 that moves as the torque tube moves to dampen unintended impulsive movement of the torque tube due to wind, seismic events, or other sources while allowing the slow movement of the tracker as it rotates throughout the day.

Because this new foundation system involves rotary driven components and consists of multiple parts that need to be assembled with precision, this new foundation system cannot be installed with a conventional equipment. Therefore, the Applicant of this disclosure also developed a new machine to install them aptly named the truss driver. The truss driver shares the same basic tracked chassis platform as other pile driving machines including a hydraulic system and articulating mast. The differences lie in the components mounted on the mast that drive screw anchors into the ground and the automated control system that controls the machine's operation. The truss driver uses a rotary driver to impart torque and a crowd motor mounted on the mast to pull the rotary driver down. Additionally, a tool driver mounted on the mast above the rotary driver may be used to independently drive a drill shaft through the screw anchor and rotary driver to assist with screw anchor ground penetration.

Although tracker makers' systems have historically been paired with H-pile foundations, most manufacturers are agnostic as to the type of foundation as long as the foundation components are capable of supporting the loads generated by tracker system with the correct geometry and as long as spatial deviations are kept within the acceptable tolerances. This is in part due to the fact that H-piles are more or less a fungible commodity. However, even though H-piles provide a single-component foundation, they must still be driven with precision to avoid later alignment steps to remediate driving errors. Therefore, the various embodiments of the invention are usable with the Ojjo EARTH TRUSS ecosystem as well as with conventional solar pile drivers that drive H-pile foundations.

Turning back to FIG. 2, this figure shows machine 20 for driving foundation components into supporting ground traveling along a surveyed row. As noted above, this could be one of any number of machines currently available from Turchi, Mazaka, Gayk, or Pauselli, among others. Alternatively, it may be a truss driver machine for driving screw anchors and assembling the EARTH TRUSS from Ojjo, Inc., the applicant of this disclosure. In either case, with existing installation techniques, machine 20 is positioned along each intended tracker row marked with survey flags, and a monopile or adjacent screw anchor pair is driven at the point along the tracker row indicated by the flag (e.g., $10A_1$, $10A_2$, $10A_3$). In the case of monopile foundations, these components are driven plumb directly at the marker locations. In the case of the EARTH TRUSS, screw anchors are driven adjacent one another to straddle the intended North-South line of the row at the foundation markers at the place in X (North-South tracker row) indicated by the survey marker. In some cases, the machine mast may be configured on the side of the machine so that it can be operated in either direction while driving foundation components and to avoid running over the foundation markers. In other cases, the mast may be configured closer to the middle of one end of the machine, requiring the machine to driven in the opposite direction (with the mast trailing) from that shown in FIG. 2. Once the end of a row is reached, the machine is turned around and the process continues until piles have been driven or trusses constructed at each intended location for the array.

As discussed above, current installation practices, whether for H-piles or EARTH TRUSSES, require a precise and expensive survey to correctly mark the location of every ground penetrating H-pile or every truss in each row as well as the end points of each row. This is typically done using differential global positioning systems (GPS), lasers as well as other manual surveying tools with a team of workers placing a physical marker at each ground penetration point. The applicant of this disclosure has proposed incorporating this functionality into the installation machine so that the costs can be spread over hundreds or even thousands of tracker installations, greatly simplifying and in some cases even eliminating the need for a pre-construction site survey.

Figure 3:
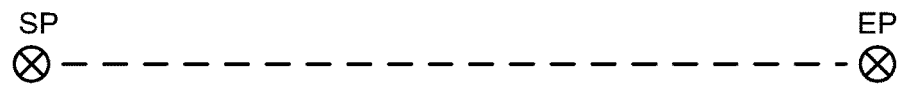
FIG. 3 shows a site survey for a single-axis tracker array according to various embodiments of the invention.

To that end, FIG. 3 shows a portion of a survey consistent with the various embodiments of this disclosure whereby only two survey points have been marked for each row. In various embodiments, survey points SP and EP, starting point and end point, may mark beginning and ending points of the row, that is the first and last foundation points for each row. In other embodiments, these points may simply be a pair of reference points that are aligned in a common North-South line with the row but that bound rather than define the ends of the row, that is, they are outside the dimensions of the row but still dictate the intended North-South line of the row. According to this paradigm, the number of required survey points is vastly reduced to only two per row as opposed to dozens for each row, substantially reducing the cost of the survey. It should be appreciated, however, that in some cases it may be possible to eliminate the survey all together other than confirming the metes and bounds of the property and any identifying existing features. Using the same technology integrated into the machine control system, the machine itself can determine the two outside reference points with the requisite precision, in particular because they are not part of the tracker row, but instead merely bound it. As long as the distance between the reference points can be measured with high precision (e.g., less than half an inch or 12 mm), the machine can travel along the row defined by points $10A_1$ and $10A_2$, orienting itself on path with differential GPS and using a more accurate laser-based systems to find where in X, the North-South axis, along the row to install each foundation component, whether H-pile or truss.

Figure 4:
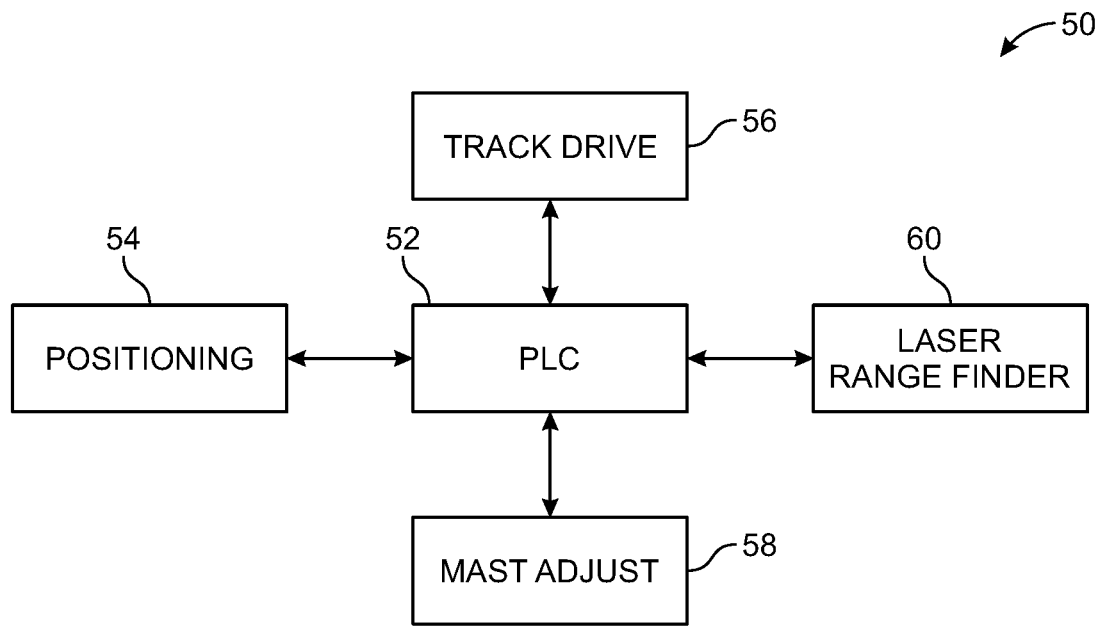
FIG. 4 is a system for automatically driving and orienting a solar foundation driving machine according to various embodiments of the invention.

FIG. 4 is a block diagram showing exemplary components of system 50 for accurately installing tracker foundations with a solar foundation driving machine without survey markers at every ground penetration. The brain of the system is programmable logic controller PLC 52 which is used to control the machine, the mast, and various mast components that orient and drive H-piles or screw anchors into the ground. PLC 52 is a computerized controller used to control operation of the machine and to receive sensor information indicative of real-time conditions of various components of the machine. It may be one of many commercially available off-the-shelf units from Rockwell Automation, Schneider Electric, Omron, Siemens, among many others. PLC 52 may be located on the machine or on a remote control that is communicatively coupled to the machine. PLC 52 is coupled to positioning system 54 and the track drive 56 that physically moves the machine on the array site. Positioning system 54 may be a global positioning system or some other satellite based positioning system (e.g., GLONASS, COMPASS, Galileo, etc.), or a hybrid terrestrial-satellite based system such as differential GPS that places a base station on a job site that is located with the satellite constellation and then orients local receivers with respect to the base station for greater resolution than that available with GPS alone. PLC 52 is also coupled to mast adjustment system 58 which, includes several controllable motors and actuators as well as a plurality of linear encoders, rotary encoders and other sensors providing positional and other feedback to PLC 52.

With information from positioning system 54, PLC 52 can control track drive 56 to position the machine at the start of a tracker row, at a surveyed reference position, or at a stored or calculated reference position. Positioning system 54 may have sufficient resolution to position the machine close enough to the desired position that fine adjustment may be made while the machine itself remains in place by mast adjustment system 58. To accomplish this, a first laser is placed at one end of the row or at a reference position along the row. Depending on the orientation of the mast on the machine (e.g., front, back, side) the machine will either move towards or away from the laser as it completes each foundation. In various embodiments, the first laser will project a laser beam down the row overlapping with or parallel to a portion of the intended axis of rotation. The beam of the laser will impinge on a target or sensor on the machine, that is located at a point that represents the location of the rotational axis above that foundation so when the H-pile is driven, or the truss constructed, the torque tube or bearing pin will align with the others in the same row. In some embodiments, as shown in greater detail herein, the target may be mounted on the mast so that the machine can be aligned in the Y direction (e.g., left or right of the laser line or East-West), the Z-direction (e.g., above or below the laser line), and in yaw (e.g., twisted left or right about a vertical axis passing through the laser line). If manually aligned, the target may consist of a series of vertical apertures that allow light to selective pass to a target point representative of the rotational axis. In this way, an operator can manually adjust the height (Z), left and right in plane movement (Y) and left and right rotation about the laser line (yaw) to get the driving axis in the correct location.

In an autonomous alignment mode, one or more sensors at the laser target may allow the PLC to adjust the mast in Y, Z and yaw with a simple algorithm that zeros in on the optimal orientation by making micro adjustments and measuring where energy received at the sensor is maximized, symbolizing that the mast is aligned in Y, Z and yaw. A lens or other optical device may block or diffuse light that is not normal to the sensor surface, making such automated control easier. In various embodiments, the machine may self-level, that is making its own adjustments in pitch and roll independent of the laser with one or more inclinometers. In various embodiments, PLC 52 will be coupled to controllers, labeled mast adjust 58 in the figure, that enable the position of the mast relative to the machine to be controlled to effect changes in at least 5 degrees of freedom (e.g., Y and Z-directions, in addition to pitch, roll and yaw). In some cases, pitch and roll adjustment may occur automatically as PLC 52 self-levels the mast (i.e., aligns it in pitch and roll) prior to aligning it in Y, Z, and yaw.

In various embodiments, the PLC is communicatively coupled to a second laser, labeled "laser range finder" 60 in FIG. 4. In various embodiments, laser range finder 60 is set up at a reference location at the end of the row to project a laser beam on a portion of the machine that is reflected back so that the X-distance between the laser and the portion of the machine can be calculated with high precision. This information is then transmitted to PLC 52 so that the PLC can control mast adjustment circuit 58 adjust the mast's X-axis position so that the measured distance equals the required distance for the next foundation component relative to the reference location of the laser. With this configuration, PLC 52 can move the machine by controlling track drive 56 with information from positioning system 54 to the correct location to begin foundation installation for a row and can determine a reference position or starting position of the row with a combination of global or local positioning. The mast can then be adjusted, either automatically with mast adjust circuit 58 or under manual operator control to achieve Y, Z, pitch, roll and yaw alignment, and then laser range finder 60 may be used as discussed herein to enable PLC 52 to control the machine to achieve X alignment with the intended location of the ground-penetrating foundation.

Figure 5:
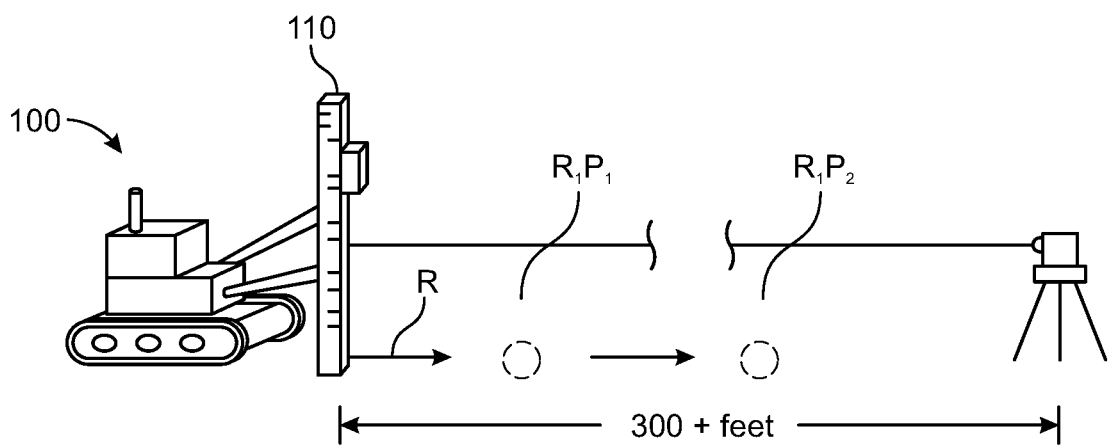
FIG. 5 is a solar foundation driving machine driving a foundation components with the system of FIG. 4 according to various embodiments of the invention.

FIG. 5 shows a foundation component driving machine 100 traveling on row R and using the range finding laser to precisely orient mast 110 over the point $R_1P_1$ and $R_1P_2$ along the North-South line where each foundation is supposed to be installed. A single row may span 300 feet or more, so the laser needs to be accurate to within a few millimeters at this range to meet tracker maker tolerances. H-piles, trusses, and various tracker hardware typically include slots instead of holes to enable some adjustment in at least the X, Y, and sometimes Z direction to take up half an inch or 12-millimeters of misalignment, but that tolerance budget will be used up quickly if errors are propagated down the row. The dotted circles marked $R_1P_1$ and $R_1P_2$ in FIG. 5 represent specified installation points for foundation components. The circles are dotted to designate that there is no flag or survey marker in the ground. Rather, the machine has the distance from the end of the row stored and precisely orients the machine and mast to that distance so that an H-pile can be driven, or truss foundation constructed without needing markers at every intended point of ground penetration.

Figure 6:
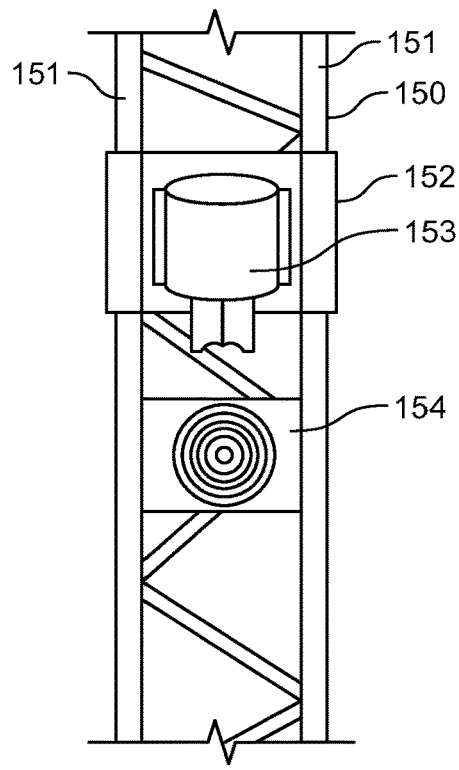
FIG. 6 is a portion of a mast of a screw anchor driving machine according to various embodiments of the invention.

FIG. 6 shows a portion of mast 150 of a truss driver machine including a rotary driver 153 attached to carriage 152 moving on parallel rails 151 extending the length of mast 150. In this figure, reflective target plate 154 has been placed at a fixed point on the mast. In various embodiments, target plate 154 may be attached to carriage 152 so that it is able to move along the mast with carriage 152. In other embodiments, it may be permanently attached to mast 150 at a known position along the mast's length. In some embodiments, mast 150 may be controllable to be moved so that the beam of the range finding laser impinges on target plate 154 after mast 150 has been leveled and aligned in Y (East-West), Z (height) and yaw (a measure of angularity off of the intended North-South axis). In other embodiments, in particular in an autonomous alignment mode, all of these adjustments may be made at substantially the same time as discussed in the context of the system of FIG. 4. In various embodiments, laser light striking target plate 154 is reflected back to a sensor and the time between departure and arrival is used to precisely calculate the distance traveled. In other embodiments, a phase shift technique may be used to calculate the distance. This distance when compared to a known distance may be used to orient the mast manually or automatically to the precise location in X where the truss foundation should be constructed, or in the case of an H-pile, where the H-pile should be driven.

Figure 7:
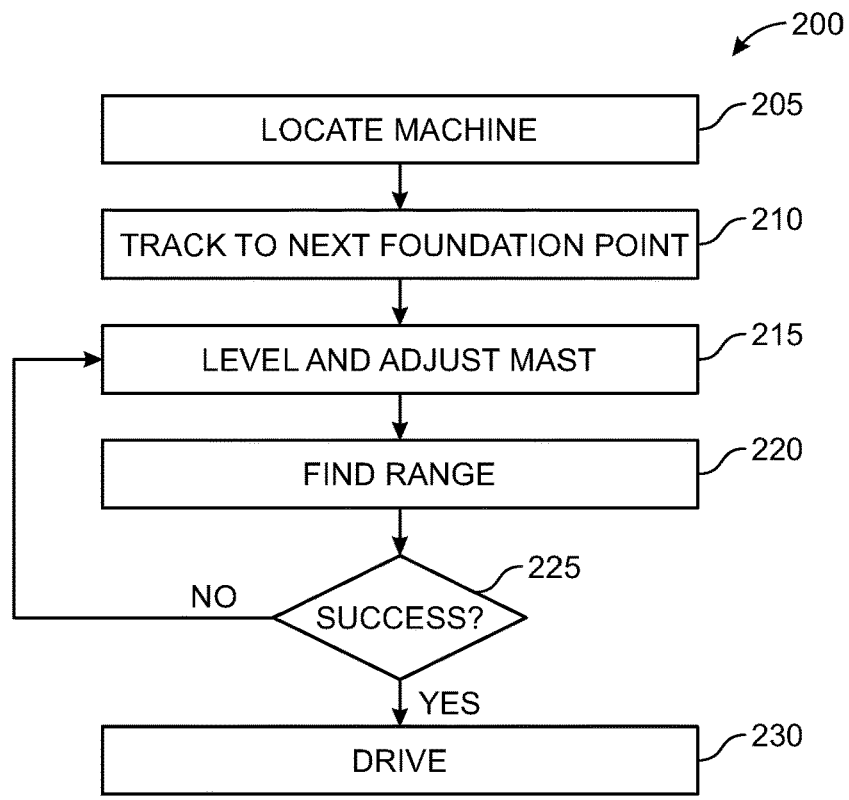
FIG. 7 is a flow chart detailing the steps of a method for orienting a screw anchor driving machine along an intended tracker row according to various embodiments of the invention.

FIG. 7 is a flow chart detailing the steps of method 200 for accurately driving foundation components for a single-axis tracker with foundation component driving machine having endpoint survey locations only or, alternatively, no survey data according to various embodiments of the invention. The method begins in step 205 with locating the machine or a reference point on the machine or machine mast relative to a known reference location on the array site. As discuss herein, in some embodiments this may be done using GPS or other satellite-based location systems. GPS is typically accurate to 2-3 meters. If that is not accurate enough, differential GPS may be used to increase to centimeter level accuracy. Although centimeter accuracy may not be accurate enough for range finding purposes, it is sufficiently accurate for row placement and selecting row start and stop points since rows are typically spaced apart by multiple meters. Once the machine position has been located on the job site, in step 210 the machine, either under manual or automated control by the PLC, is tracked to the next foundation position, or as close to that position as is possible with tracked movement.

After the machine is positioned, next, in step 215, adjustment is made to the orientation of the mast to achieve level, correcting for local pitch and roll under the mast. At the same time, alignment in Y, Z and yaw are performed. As discussed herein, pitch and roll alignment may be done automatically under control of the PLC with one or more inclinometers mounted on the mast that provide a very accurate indication of the mast's level. Y, Z, and yaw alignment may be achieved with an alignment laser positioned at the end of the row projecting a reference beam. In various embodiments, this reference beam may be set to overlap with the intended rotational axis of the tracker system so that as each foundation is installed or driven to support a bearing that is aligned in Y, Z, pitch roll and yaw with every other bearing in row. This reference beam impinges on a target on the mast and may be used to manually align the mast's target with the beam. This will insure that the current foundation will support a torque tube or other rotating member at a height that matches that of the other foundations in the same row. Alternatively, as discussed above, this reference beam may instead enable the PLC to self-align the mast in Y, Z, and yaw.

Next, in step 220, a range finding laser is used to determine the distance between the target reference on the machine and the laser. In step 225, the PLC determines whether or not the machine is at the correct location in X based on the range. As discuss herein, the distance measured by the range finding laser is compared against the expected distance for the current foundation. Depending on whether or not mechanical interference with the foundation is a constraint for the particular tracker system being supported, tolerance in the X-direction may be very tight, requiring foundations to driven with great precision in the X-direction. The range finding laser may be collocated on the same tripod or support as the alignment laser or may be on an adjacent tripod or support. In various embodiments, the range finding laser will project a laser beam that is parallel to the beam of the first laser. In various embodiments, this laser will impinge on a reflecting target located on the mast of the machine at a distance that, in the case of a screw anchor, matches the distance to the centerline of the screw anchor when it is loaded on the rotary driver so that the precise distance from the centerline of the screw anchor to the laser can be measured. In the case of a H-pile, the reflective target may be located at a point on the mast that is at the same X-axis distance as the web portion of the H-pile since H-piles are typically driven with the web portion facing North-South and the flanges facing East-West. In various embodiments, the laser is projected along a path that is clear of interference from any of the previously installed foundations in the same row. In some embodiments, the range finding laser may communicate the result to an user interface device accessible by the operator on the machine or on a remote that informs the operator whether the mast is aligned in X, short in X or long in X so that adjustment can be made. In other embodiments, the range finding laser will communicate with the PLC to find calculate distance to target and to wirelessly transmit the calculated distance to the PLC. In step 225, a determination is made as to whether or not the measured range is equal to the expected range, or within an acceptable tolerance. If so, operation proceeds to step 230 where driving may be being. Otherwise, operation returns to step 215 where so that the PLC can make any required correction in the X-direction (that is, along the North-South axis of the laser), such as, for example, by actuating an X-slide that moves the mast in its current plane to enable the measured distance to be equal to the specified distance for the current foundation component. For given row and given tracker system, the machine will have previously stored information indicative of the spacing between foundations and this information will be used to locate the machine as well as to adjust the X-axis orientation of the mast so that the distance calculated by the range finding laser is substantially the same as the required distance for the foundation component. For example, if the required foundation spacing is required to be 1000 cm, the laser is offset from the last foundation location by 500 cm, and this is the third foundation in the row, the PLC will continue to adjust in the X-direction until the distance measured by the laser is precisely 3500 cm from the starting reference position. It should be appreciated that in some embodiments, the second laser may project along the same or substantially the same path as the first laser. For example, the laser may have a pair of adjacent diodes or other light emitting components that emit laser light alternatively every other fraction of a second or at the same time. In some embodiments, the first laser may be in the visible spectrum while the second laser may be in the infrared spectrum.

In various embodiments, this alignment process is repeated iteratively between steps 215 and 225 until success is achieved. Once it is, the PLC provides an indication that foundation component may be driven and operation proceeds to step 230. In the case of an H-pile, this typically involves a human operator raising the pile driver while the mast remains at the correct orientation and lifting the H-pile on to one end so that it can be loaded to the driver and driven to depth. A guide, collar or other device may hold the pile at the lower end of the mast to keep it traveling on the desired driving vector while the pile driver repeatedly impacts or vibrates it into the ground. Alternatively, in the case of a TRUSS DRIVER machine driving a screw anchors for an EARTH TRUSS FOUNDATION, the rotary driver raised so that an operator can load a screw anchor on to the rotary driver. Then, the operator lowers the angled mast to the ground at the desired driving angle (adjusted for any roll offset and maintaining or restoring the latched X, Y, Z, and yaw orientation) and initiates the automated driving process. After the first screw anchor of the pair has been successfully driven to depth, the mast is adjusted back to plumb and the rotary driver withdrawn up the mast to allow the second screw anchor to be loaded. Once loaded, the mast is oriented to the desired driving angle and slides down to the ground while preserving or restoring the latched orientation to begin the automated driving process.

Figure 8A:
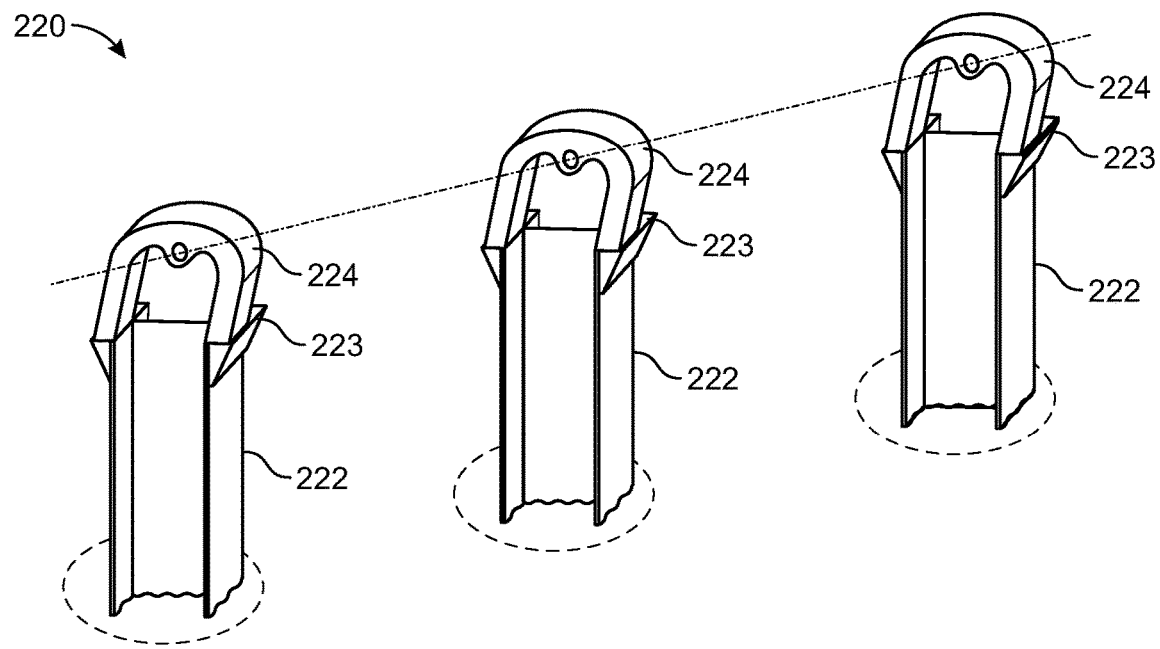
FIG. 8A is a portion of a row of driven H-pile foundation according to various embodiments of the invention.
Figure 8B:
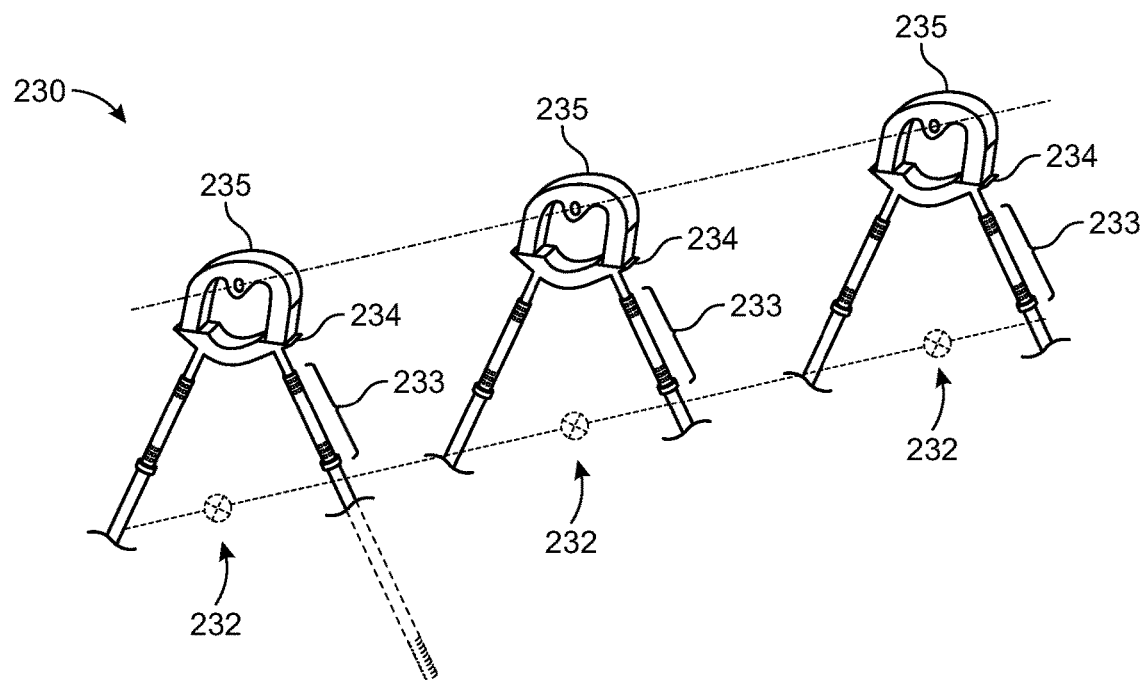
FIG. 8B is a portion of a row of EARTH TRUSS foundations according to various embodiments of the invention.

FIGS. 8A and 8B show a partial row of H-piles and EARTH TRUSSES respectively that have been driven with a machine and methodology discussed herein. In the example of these figures, the tracker bearing attached to the respective foundations is a top-down or mechanically balanced tracker such as that manufactured and sold by NEXTracker, Inc. of Fremont California, a subsidiary of Flex, Ltd. In the NEXTracker system, the torque tube is suspended from a bearing pin that sits in the bearing pin opening of the bearing housing assembly. The assembly constrains the extent of swing of the torque tube to prevent excessive movement. If a different tracker system is used, the alignment laser may be set to the height and orientation of the rotational axis used by that system. It should be appreciated, however, that the particular tracker system chosen is a design choice and not limiting on the various embodiments of the invention. Although each will have its own specific dimension and tolerances, the various embodiments are compatible with a number of different types and brands of single-axis trackers.

Starting with FIG. 8A, this figure shows a portion of tracker row 220. After the alignment and range finding lasers are set up, the machine drives H-piles 222 along the tracker row with precise spacing between foundation members. As discussed herein, one laser may be used to achieve Y, Z, and yaw alignment while another is used to for range finding purposes. In this figure, piles 222 are shown with right angle brackets 223 and bearing housing assembly (BHA) 224 installed on top. With H-piles, these NEXTracker-specific tracker components are usually not installed at the time that piles are driven because they are not part of the foundation. Therefore, in order to achieve precise alignment and avoid later remediation steps, alignment may be performed with the assistance of a jig or target on the mast that approximates the geometry of these parts and/or the rotational axis location for a NEXTracker tracker based on a known distance from the head of the pile to the bearing pin. If a different tracker will be used, the alignment laser will be set to project a beam at the height and orientation required by that tracker and to the extent a jig is used, it will approximate the geometry of that bearing. The range finding laser will impinge on a target placed on the machine mast that is aligned with the web of the H-pile so that the web-to-web distance between two consecutive H-piles in the row may be precisely and consistently measured.

FIG. 8B shows partial row 230 of EARTH TRUSS foundations supporting NEXTracker tracker hardware. To install this row, the machine is moved along the row to the correct location in X 232, and pitch, roll, yaw, Y, and Z adjustments are made to the machine mast to insure that the truss will support the NEXTracker BHA at an alignment that enables the bearing pin opening to align with others in the same row. Once that is done, a pair of screw anchors are driven into ground on either side of the point in X. Then, truss cap 234 is held in place at the right orientation by a jig on the mast while upper leg connections are made between screw anchors and truss cap 234 to complete each truss leg 233. In this example, a truss cap is used to join each adjacent leg pair and to provide a platform for the NEXTracker BHA. In this case, the alignment laser is set to an orientation that passes through the bearing pin opening of each BHA. The range finding laser is projected down the line onto a reflective surface on the mast of the machine that is aligned with the centerline of a screw anchor when its attached to the rotary driver. In this way, the distance from centerline to centerline of successive truss foundation may be enforced with a high degree of accuracy.

Figure 11:
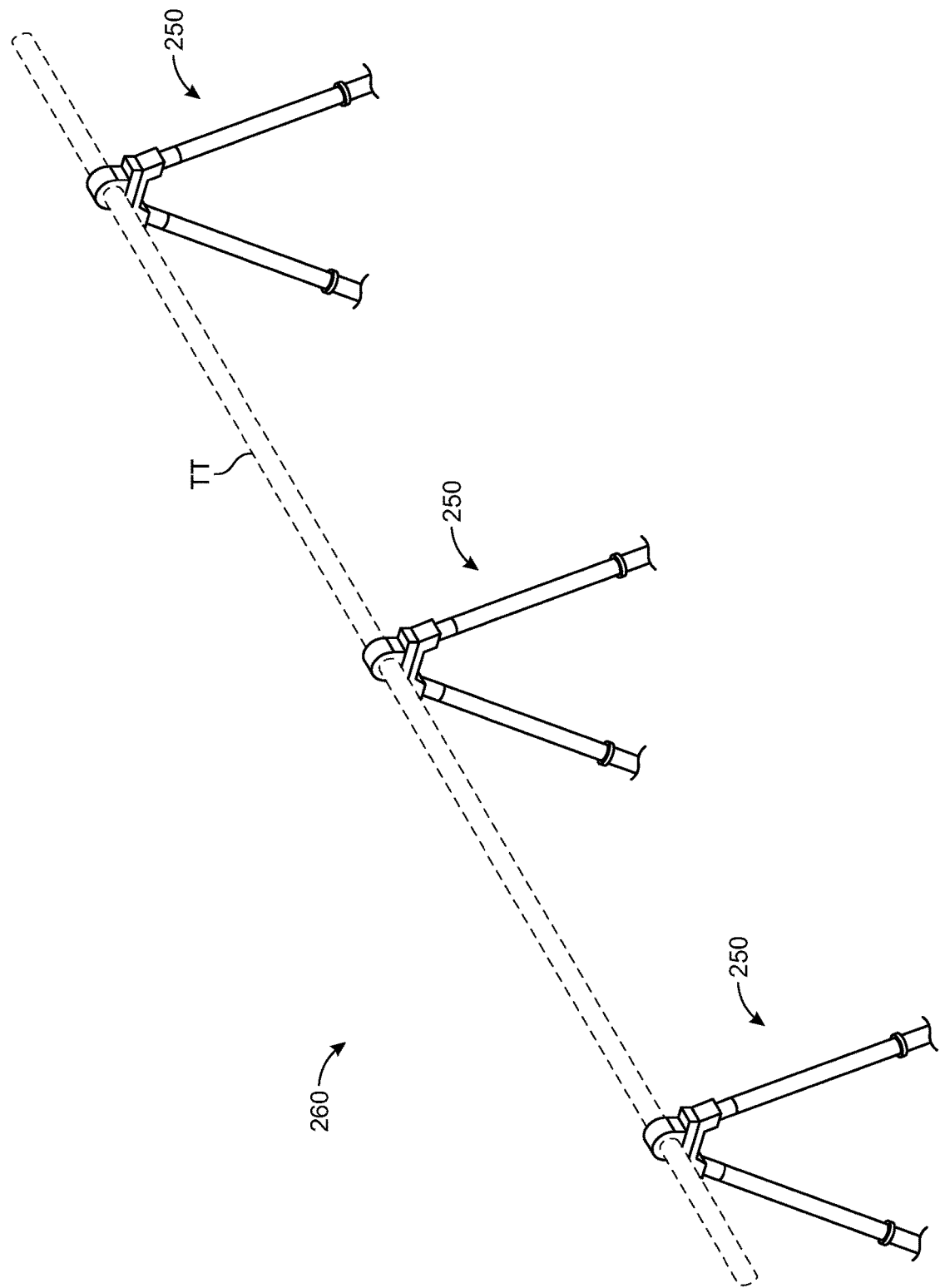
FIG. 11 is a portion of a single-axis tracker row consisting of assembled EARTH TRUSS foundation according to various embodiments of the invention.

Turning to FIG. 11, this figure shows a section of a tracker row 260 with three EARTH TRUSS foundations 250 evenly spaced along the North-South tracker row. Although only three foundations are shown, in real-world applications there may be several dozen per row. The torque tube labeled "TT" is shown as a dotted line to demonstrate the required alignment of the foundation components. A single tracker row may extend as long as 300 feet so it critically important that each foundation is aligned with respect to adjacent ones so that the bearing supported by each will capture the torque tube or other rotating member along a common axis. Misalignment from truss to truss that exceeds the tolerance allowed by the tracker maker may lead to premature failure of the tracker, or the need to disassemble and reconstruct the truss. Also, because the tracker is constructed in stages, the crew installing the foundation and truss cap may not have the bearing assembly and torque tube to confirm alignment at the time the foundation is constructed. Therefore, it is important to get it right the first time.

In order to accomplish the requisite alignment, as discussed herein, the applicant of this disclosure has developed a semi-automated screw anchor driving machine known commercially as the truss driver that tracks to the desired installation location, drives each screw anchor pair into the ground, and assists with assembling each truss above the pair of driven anchors. The machine carries an articulating mast that holds the driving equipment so that it travels along an intended driving axis. As discussed in greater detail herein, the machine is position along the intended tracker row and one or more lasers located proximate to the end of the row are used to align the machine in X, Y and Z and pitch, yaw, and if necessary, roll, to achieve consistent, repeatable installations.

Figure 12A:
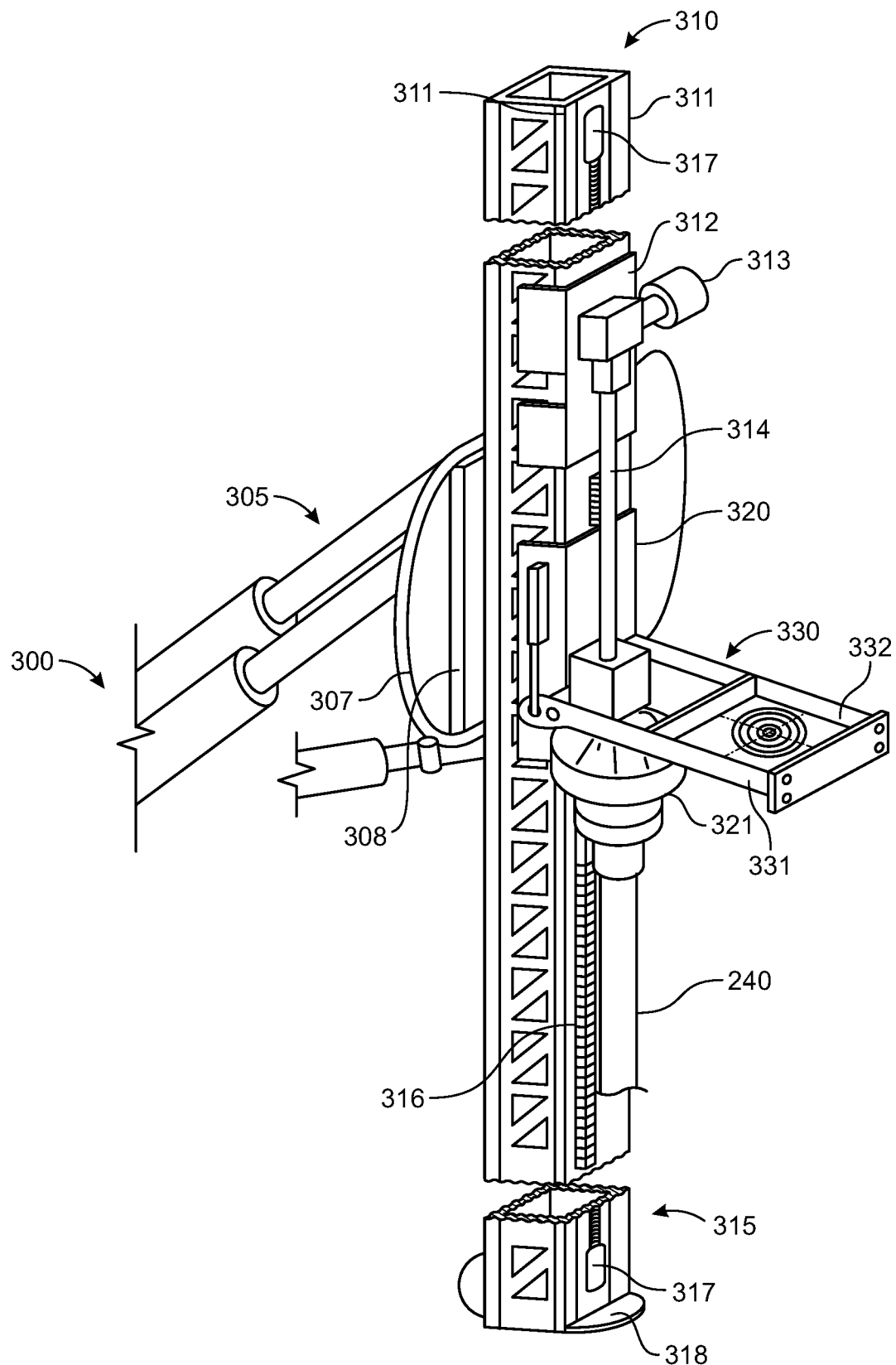
FIG. 12A is a perspective view of a portion of a truss driver machine mast according to various embodiments of the invention.

Turning to FIG. 12A, this figure shows a version of a mast of truss driver machine 300 according to at least one exemplary embodiment of the invention. The details of machine 300 have been intentionally omitted from this disclosure other than to say that in various embodiments, it may have a diesel motor that powers a hydraulic system and may ride on a tracked chassis. It should be appreciated that future versions of the machine may be electrically powered. Such modifications are within the spirit and scope of the invention. Also, it should be appreciated that machine 300 could instead ride on tires, on a combination of tires and tracks, on a floating barge, on rails or on another movable platform.

With continued reference to FIG. 12A, mast 310 is an elongated steel structure extending approximately 15-25 feet in the long direction. It is formed from multiple elongated sections of steel welded together to form a unitary structure with a boxed-shaped cross section. For ease of illustration, two breaks are made in mast 310 shown in the Figure, near the top and bottom, to enable it to be drawn on a single page. Mast 310 is connected to machine 300 by one or more hydraulic actuators 305 that control its movement relative to the machine supporting it. In various embodiments, at least one of the actuators enables mast 310 to change orientation from a stowed position where the mast is substantially parallel to the machine's tracks, to an in-use position where the mast is substantially perpendicular to them. When the mast is in the stowed position, its height is minimized, whereas when moved to the in-use position, it will extend far above the machine. In various embodiments, a rotator such as rotator 307 may sit between 300 machine and mast 310 in front of the one or more actuators 305 connecting the mast to the machine so that mast 310 can rotate through a range of angles about a point of rotation (e.g., plus or minus 35-degrees from plumb) to drive screw anchors into the ground at a range of angles while the machine remains stationary. This also decouples the driving angle from the left to right slope of the ground under the machine, allowing it to compensate for uneven terrain (e.g., roll). A slide positioned such as slide 308 in front of rotator 307 may allow the entire mast to slide at the angle set by the rotator.

In various embodiments, in addition to rotating in plane, articulating mast 310 may move with respect to machine 300 so that it can self-level (e.g., adjusting its pitch and roll), adjust in yaw, and move to some degree in the X, Y, and Z-directions (where X is North-South, Y is East-West, and Z is vertical) without moving the machine. As opposed to actuators used to position the mast, the components of the machine used to drive screw anchors are mounted on and move with mast 310. Therefore, the mast's orientation dictates the vector or driving axis that screw anchors are driven along. Parallel tracks 311 extending substantially the entire length of the front of mast 310 define the axis that those components travel along.

Starting at the bottom of mast 310, lower crowd motor 315 is mounted near the base of the mast 310 on the back side, out of the way of moving components. Lower crowd motor 315 powers a drive train such as a heavy-duty single or multi-link chain 316 that runs substantially the entire length of the mast between chain tensioners 317. A lower crowd or carriage 320 travels on parallel tracks 311 via the drive chain 316 and supports rotary driver and chuck 321 that connects to the driving collar of the screw anchor 240. When lower crowd motor 315 pulls down on chain 316, lower crowd 320 causes rotary driver 320 to push down on the head of an attached screw anchor with the same force while rotary driver 321 applies torque to the anchor's head. Tool driver 313 which, in this example, is a hydraulic drifter, is attached to upper crowd or carriage 312 traveling on the mast above the rotary driver. Hydraulic drifters are often employed in rock drilling machines to provide a selectable combination of rotation and hammering depending on the type of bit used. In various embodiments, tool 313 consists of output shaft 314 that extends along the mast, through rotary driver 321 and the center of the screw anchor 240 and terminates in a bit or tip. Herein, the word "tip" is used generically to refer to the tool attached to the end of the shaft controlled by the tool driver and may be a drill bit (button, drag, cross, tri-cone, etc.), a pointed mandrel tip, or other suitable tool. In various embodiments, the tip is maintained slightly ahead of the open threaded end of screw anchor to assist with embedment.

In some cases, during a screw driving operation, lower crowd motor 315 may pull down on upper and lower crowds or carriages 312, 320 simultaneously via the drive train, causing the rotary driver and tool driver to travel down mast at the same rate. In other cases, as discussed in greater detail below, it may be desirable for tool driver 313 to travel independent of rotary driver 321. To that end, an upper crowd motor or drifter motor (not shown) may also ride on the drive train but may selectively disengage from it to move tool driver 313 independently along mast 310. This enables tool driver 313 to extend the tip further past the screw anchor as well as to withdraw it without moving the screw anchor or rotary driver 321. This functionality may also be used to move the upper crowd or carriage 312 in the opposite direction while lower carriage 320 moves down or remains in place.

Both rotary driver 321 and tool driver 313 may be powered by hydraulics, compressed air, or electric current. In various embodiments, and as shown in the figures, rotary driver 321 and tool driver 313 may be oriented concentrically on the mast so that tool shaft 314 can pass through the rotary driver while it is driving a screw anchor. In this manner, the tool tip may operate ahead of the screw anchor, projecting out of its open, lower end while the rotary driver operates independently.

As discussed herein, local and/or global positioning systems may be used to position the machine along the row, however, these systems may not provide sufficient accuracy to align the mast. In various embodiments, to achieve accuracy with tolerances less than one inch, one or more lasers may be used to establish a reference line along the intended tracker row. In order to orient the mast relative to such reference lines, the lasers are placed at or proximate to the end of a row to impinge on a target attached to lower crowd 320. Target assembly 330 shown in the figures is held by a four-bar frame 331 hinged to the outside of lower crowd 320. A pair of gas springs or hydraulic actuators 333 enable it to move about the hinges from a stowed position perpendicular to the mast to an in-use position, where it is parallel. When in-use, the center of reflective target 332 attached to frame 331 may match the position of a rotational axis of the tracker (e.g., torque tube or bearing pin), or a known offset from that axis, in the Y and Z-directions after the machine installs the anchors and the truss is constructed. Visual confirmation of the laser on the target can be used to adjust the mast in Y and Z and a range finding laser can be used to adjust the target/mast distance in the X-direction until the precise distance for the current foundation has been achieved. When alignment is complete, target assembly 330 may be manually or automatically moved back to the stowed position while the two adjacent screw anchors are sequentially driven.

In various embodiments, after the machine has been aligned, rotary driver 321 is loaded by sleeving screw anchor 240 over the tool shaft 314 until it reaches rotary driver 321's chuck. Alternatively, tool driver 313 may be withdrawn up the mast until shaft 314 and the tip are substantially out of the way. Then, mast 310 may be moved to the desired driving vector to begin driving. As discussed in greater detail herein, in some embodiments, this may comprise aligning mast 310 and then rotating about its rotational axis while remaining it in the aligned plane. In other embodiments, the entire mast may be moved so that the point of rotation is oriented somewhere along the driving axis. This will insure that driven screw anchors point at the desired common work point of the A-frame-shaped truss. In various embodiments, an operator may then adjust a slide control for mast 310 to lower mast foot 318 to the point where it reaches the ground. Then, the operator initiates an automated drive operation, that as discussed in greater detail herein, if successful, results in screw anchor 240 being driven to the desired embedment depth along the desired drive vector. When the operation is complete, tool driver 313 and rotary driver 321 travel back up the mast on respective carriages 312, 320 so that a second screw anchor may be loaded before moving the mast in the opposing direction to drive the adjacent screw anchor. When completed, the pair of driven anchors should point at a common work point in free space. In other words, an axis through the center of each should roughly intersect at a point or region in free space that intersects or is above the rotational axis of the tracker.

Figure 12B:
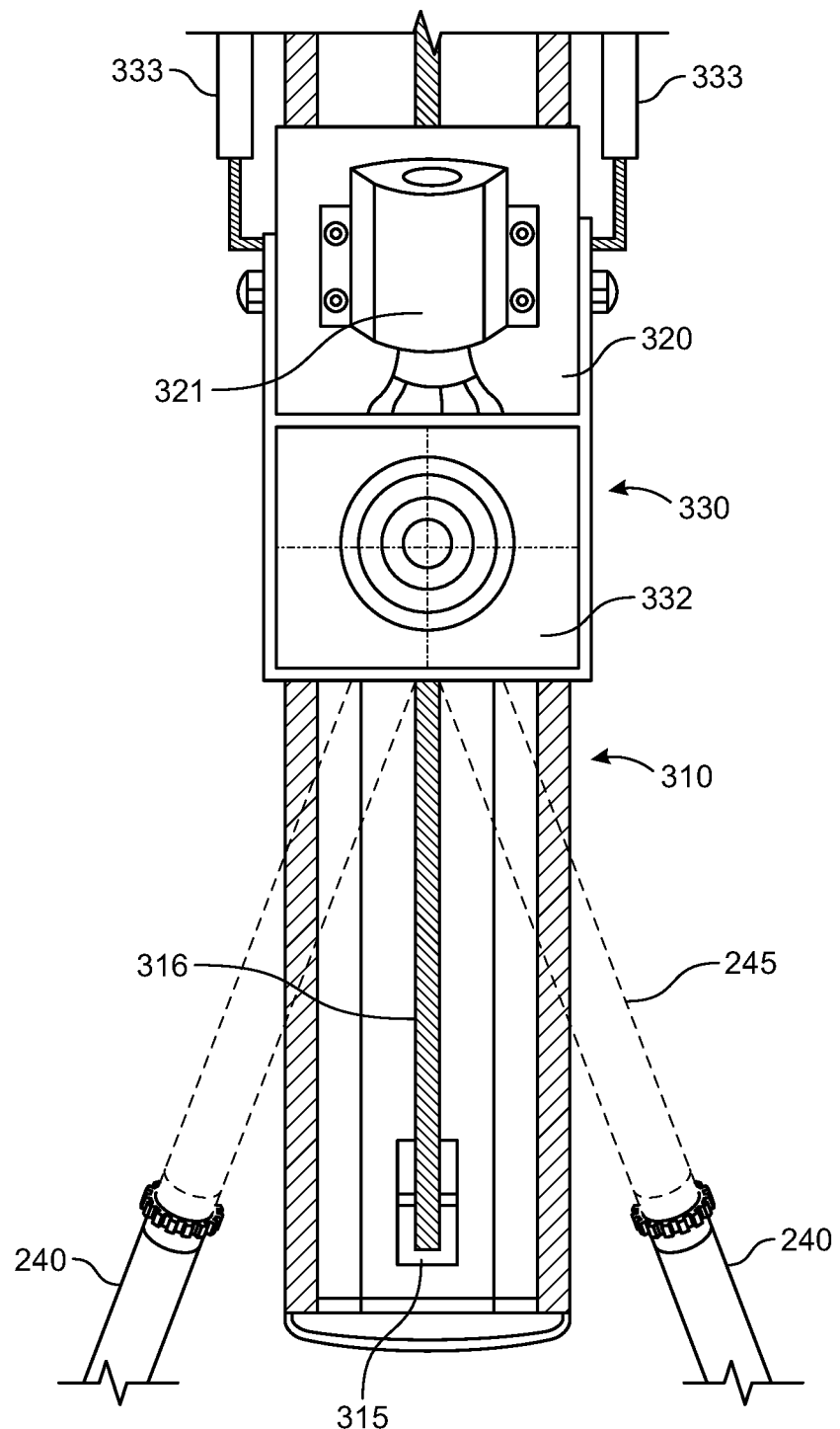
FIG. 12B is a front view of a portion of a truss driver machine mast when in an alignment mode of operation according to various embodiments of the invention.

FIG. 12B shows mast 310 of FIG. 12A with the laser assembly 330 moved to the in-use or alignment position so that reflective target 332 is normal to the impingent laser beam. In this example, two adjacent screw anchors 240 have been driven and a post-driving alignment check is being performed to confirm that target 332 is still centered with respect to the laser reference line before assembling the truss. After the second screw anchor has been driven, the controller automatically returns mast 310 to the alignment position recorded before driving started. If the machine moved at all during screw anchor driving or if one or more the encoders is inaccurate the laser may no longer be centered on target 332. If not, micro adjustment may be made to align in the Y and Z-directions, as well as, if necessary, in the X-direction by measuring range. Once alignment is confirmed, the target assembly 330 may be moved back to the stowed position, so that the truss can be assembled. Upper leg sections 245 are shown as dotted lines in this figure to show the intended alignment between driven anchors 240 and the common work point represented by the position of the center of reflective target 332

Figure 12C:
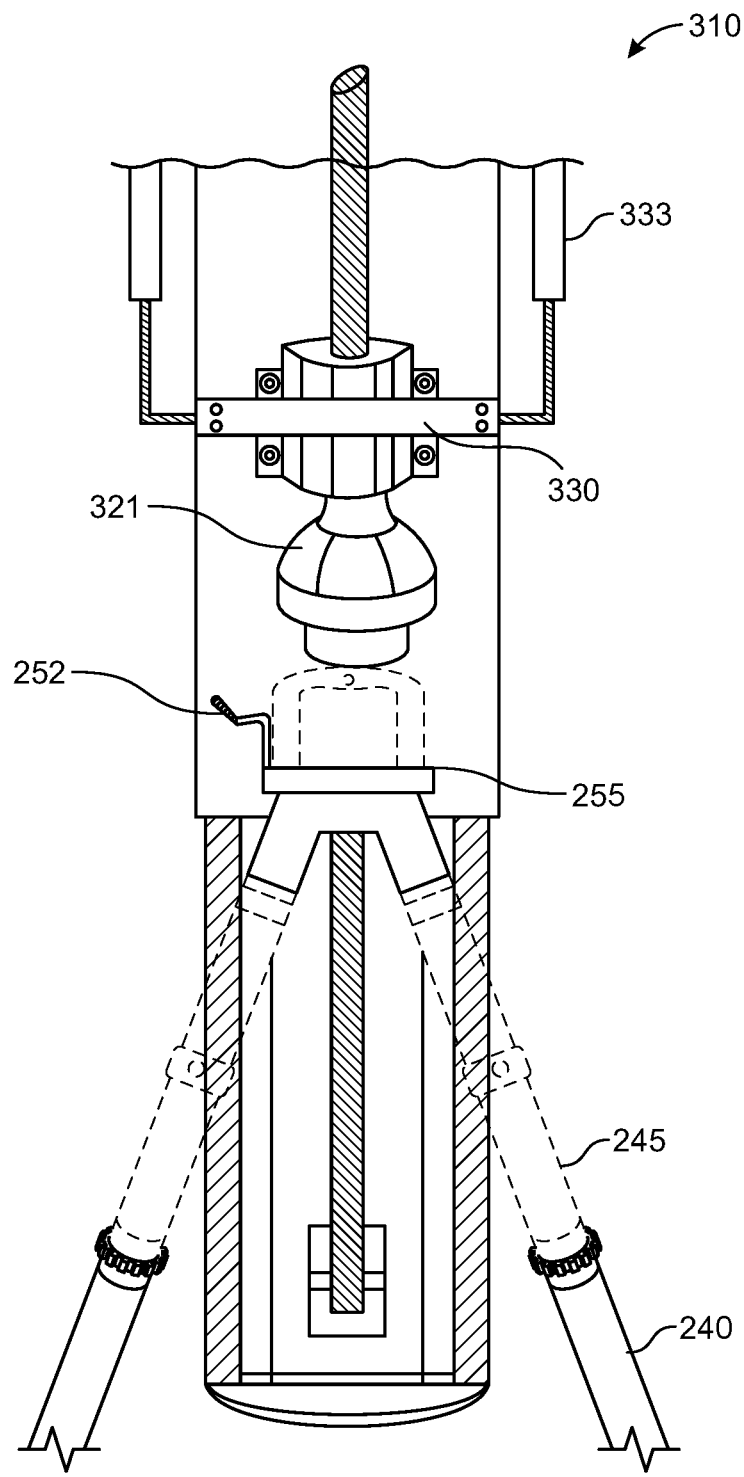
FIG. 12C is a front view of a portion of a truss driver machine mast when in an assembly mode of operation according to various embodiments of the invention.

Turning to FIG. 12C, this figure shows machine mast 310 of 12B with the laser target assembly 330 in the stowed position to enable truss assembly. In various embodiments, a truss cap holder or other jig 252 will hold truss cap 255 at a known distance and position relative to the center of the target. For example, holder 252 may hold truss cap 255 so that when it supports a bearing assembly, the bearing will be correctly aligned with the work point indicated by a center line through anchors 240 and consistent with the bearings of all the other assemblies in the same row. For a given tracker system, the distance from the center of the target to a point on the lower crowd will be the same so that if the target confirms that the mast is properly aligned, the truss cap holder will hold the cap at the correct location. When the upper leg sections are attached and crimped to their respective screw anchors and to the truss cap, they will be within the tolerance specified by the tracker maker. While truss cap 255 is held firmly in place, upper leg sections 245 are sleeved over the coupler of each screw anchor 240 and over the connecting portions of truss cap 255. Depending on clearance, it may be necessary to sleeve upper leg sections 245 over the anchors first and then to connect them to the truss cap before locking the truss cap in place with truss cap holder 252. In various embodiments, the initial loose fit will allow truss cap 255 to be secured by truss cap holder 252 even after the connecting portions of the truss cap are inserted into the open end of each upper leg section. Then, a crimper or other device may be used to lock upper leg sections 245 into place at the at the correct orientation preserved by truss cap holder 252.

Due to the multiple independently controllable actuators that effect the orientation and position of the mast with respect to the machine, automated machine control is required to maximize throughput and accuracy when driving screw anchors and assembling trusses. The same, however, is true for machine alignment. Because every actuator has a manual control, it is possible to perform the alignment steps manually, but accuracy and speed will be maximized by relying on machine automation. Therefore, the machine according to various embodiments may include one or more programmable logic controllers (PLCs) executing a control program that controls the driving functions of machine as well as pre-driving and post-driving alignment steps as described, for example, in the context of FIG. 4. The programmable logic controller or PLC may use real-time sensor data, as well as information from one or more lasers and stored program code to control the rotator and X, Y, and Z slides to achieve automated mast alignment.

Figure 13:
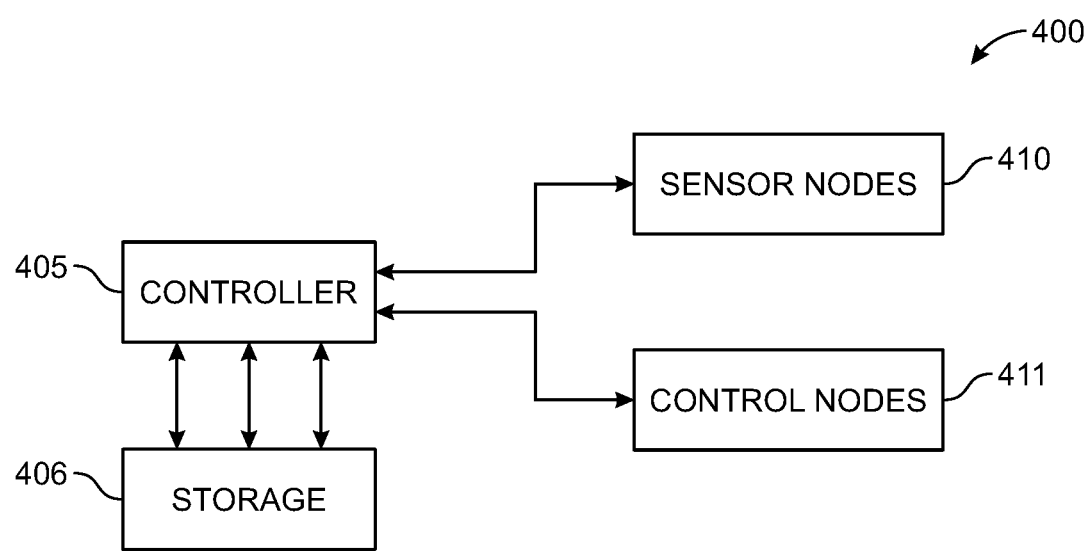
FIG. 13 is a control system for performing automated alignment of a foundation component driving machine according to various embodiments of the invention.

FIG. 13 shows one configuration of a control system 400 for performing automated and/or semi-automated mast alignment of a screw anchor driving machine according to various embodiments of the invention. System 400 may consist of one or more components on a common circuit board, multiple connected circuit boards, or a combination of common and distributed components. Moreover, combinations of wired and wireless communication links may be used between system components. Like that shown in FIG. 4, the heart of the control circuit shown in FIG. 13 is the programmable logic controller (PLC) labeled controller 405 in the figure. As discussed in the context of FIG. 4, PLC or controller 405 may be an off-the-shelf black-box device or merely a circuit board containing a microprocessor and other necessary components that is mounted in a box on the machine and controllable via a user interface and/or remote control. In various embodiments, controller 405 may execute program code stored in non-volatile memory 406, labeled "storage" in the figure. The program code executed by controller 405 may be written in structured text, instruction list, or other suitable IEC 61131-3 textual or graphical programming language standard. As shown, controller 405 is communicatively coupled to a plurality of sensor nodes 410 and a plurality of control nodes 411. A common bus may interconnect these components, such as an N-bit communication line, a wireless bus operating on one or more suitable wireless communication protocols (e.g., Wi-Fi, Bluetooth, Zigbee, ZWave, Digi Mesh, 2G-5G, etc.), or combinations of wired and wireless links. The box labeled sensor nodes 410 encompasses various different sensors that provide real-time information to controller 210. These may include encoders (e.g., linear and/or rotary) used to incrementally count the movement of moving objects with respect to a non-moving reference, pressure sensors for measuring hydraulic pressure, downforce, air pressure, and/or resistance, and other sensors. The sensors may also include one or more inclinometers used to facilitate self-leveling adjustment prior to driving.

Box 411 labeled "control nodes" refers to various controllable components including the actuators that position the mast relative to the machine including the rotator, X, Y, and Z slides and one or more external lasers within proximity to the machine. Control nodes may also refer to the driving components (e.g., the lower crowd motor, the upper crowd motor, the rotary driver, the tool driver, an air compressor and/or a hydraulic control system). Control nodes may also supply real-time state information to controller 405 as well as receiving commands from the controller 405 to make alignment adjustments of the mast.

In addition to storing program code, storage 406 may log information generated during alignment operations to track alignment time, the accuracy of the positioning system, and the extent of machine or mast movement during driving, among other information. In various embodiments, stored information may include information corresponding to a solar tracker foundation installation job, such as, for example a single-axis tracker, including high level information about a job including job owner, system operator, location, maps/images, the type of system, size of the system, components of the system and job plans (e.g., what size/type foundations to install where). Stored information may also include information generated during driving operations including the specific location where foundation components were driven, sensor data received during the driving operation indicative of driving force and torque, control signals sent to controllable nodes (e.g., lower crowder, upper crowder, rotary driver, tool driver, etc.) among other recorded information.

Turning now to FIGS. 14A-E, these figures detail components, and processes for aligning a mast of the machine in pitch and in yaw with a single range finding laser according to various embodiments of the invention. In the context of this description, yaw refers to the orientation of the driving axis of the mast about a vertical axis that is perpendicular to the intended axis of rotation. In other words, is the target and therefore the mast, normal to the impingent laser beam or is it facing slightly to the left or right of it about that vertical axis. Misalignment in yaw will result in the screw anchors being driven so as to straddle the intended North-South rotational axis in a way that diagonal rather than orthogonal to it, requiring the bearing or other apex hardware to be adjusted in yaw to compensate for the misalignment. Otherwise, strain will be put on the torque tube.

Figure 14A:
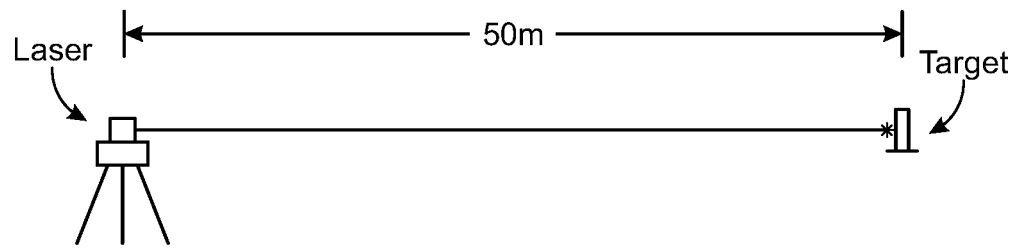
FIGS. 14A-E show steps of method and components for performing a method of automated pitch and yaw alignment of a mast of a foundation component driving machine according to various embodiments of the invention.
Figure 14B:
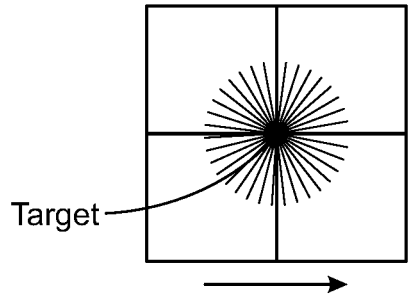
Figure 14C:
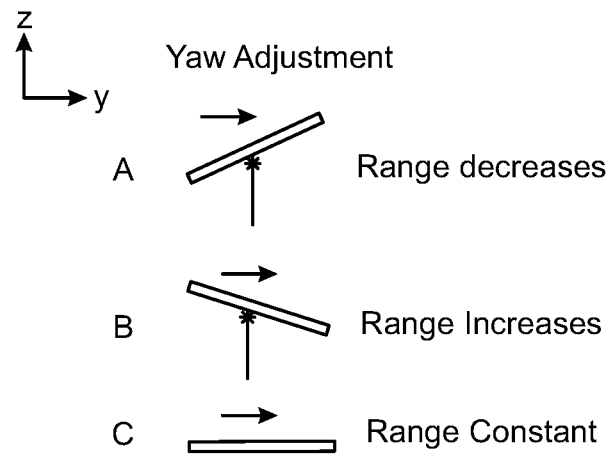
Figure 14D:
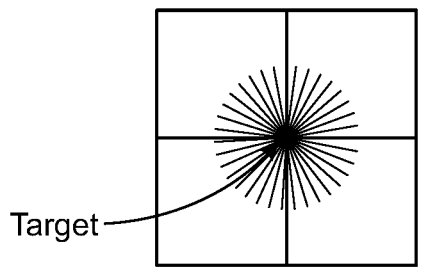
Figure 14E:
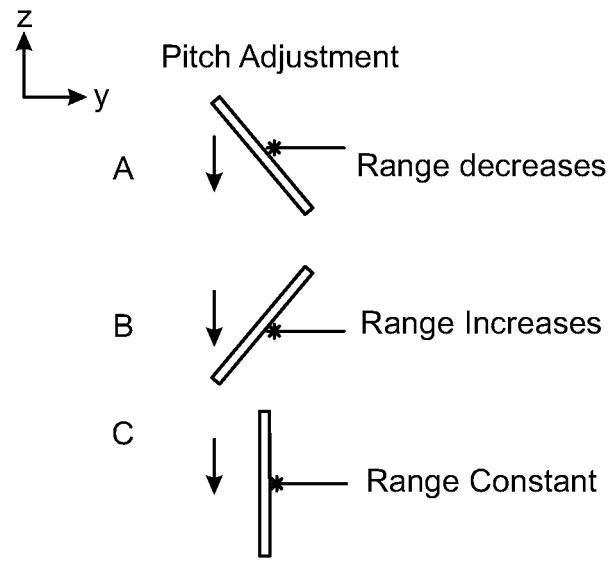

Starting with FIG. 14A, a laser is positioned on a tripod or other support at the end or at a point proximate to the end of an intended tracker row. The laser's beam should overlap with or run parallel to the intended rotational axis of the tracker for that row. When the target assembly is moved on the mast to the in-use position, the beam should impinge on it allowing the laser to calculate the distance between it and the target and to transmit that information to the controller. In the example of this figure, the laser and target are separated by 50 meters. FIG. 14B shows the beam of the range finding laser impinging on the center of the target. The 50-meter distance causes the beam to scatter outward to a much larger diameter than at close range (e.g., 1-5 meters). Depending on the distance to the target, the range finding laser may detect a range of 50 meters or something above or below that distance. Initially, the specific distance may be less important as long as it is close since the purpose here is alignment in yaw. Then, the automated controller that controls the mast components may be actuated to move the mast in the Y-direction, that is from East to West, such as, for example by controlling a Y-slide to move the mast in-plane to the left or right, while the range finding laser continues to take distance measurements. Misalignment in yaw will be indicated by changes in the measured range. As seen in 14C, as the beam impinges on the target moving from left to right (West to East), if the range decreases, it means that the target is not normal to the beam and further that the leading edge needs to be rotated toward the laser while the trailing edge is rotated away from it. If the measurements taken while the target is moved result in an increase in range, the opposite is true. That is, the leading edge needs to be rotated away from the laser source while the trailing edge is rotated toward it. In various embodiments, this rotation may be achieved by the controlling or actuating a trunnion or other linkage connecting the mast to the machine that enables it to adjust the mast in yaw. Once orthogonality has been achieved, the measured range should remain constant as the Y-slide is engaged to move the target across the beam. If this constant value is not equal to the desired X position, that is, the expected distance from the laser to the next foundation, the X-slide may be controlled to move the mast and target towards or away from the laser to reach the correct location while preserving the mast's planar orientation in yaw.

With continued reference to FIGS. 14A-E, in addition to aligning in X and yaw, a single range finding laser may also be used to align the mast of the machine in pitch. As discussed herein, pitch and roll adjustment may alternatively be made using one or more inclinometers on the mast, however, the range finding laser and related circuitry and control systems present an alternative way to accomplish this. Looking specifically at FIGS. 14D and 14E, when the target is illuminated and distance measurement recorded, the mast, and by extension the target, are moved slowly or incrementally in the Z-direction, that is vertically. If, as the target moves, the range increases, the mast is pitched backwards, whereas if it decreases, the mast is pitched forwards. Changes in pitch may be made with the controller by actuating the one or more actuators connecting the mast to the machine to tilt the mast towards or away from the machine, as necessary. Once orthogonality to the laser beam is achieved, the range should remain constant as the mast is moved in the Z-direction. On substantially level ground or in cases where the torque tube is always level, pitch alignment may be easily achieved with one or more inclinometers, however, in situations where perpendicularity to the torque tube is desired, regardless of North-South grade, positioning the laser to run along or parallel to the intended rotational axis and then adjusting pitch to be normal with respect to that will insure that perpendicularity is maintained.

In the example of the embodiments shown and discussed in the context of FIGS. 14A-E, a single range-finding laser may be used to adjust in pitch, yaw, and in X-direction position (North-South). That leaves roll, Y and Z to be adjusted through other means. As discuss herein, roll may be automatically detected and corrected for with one more inclinometers or may be manually input to the machine. Knowing roll is necessary so that when the rotator turns to the intended driving angle it can add or subtract any necessary to account for left to right (East to West) slope of the row. Also, alignment in Y and Z may be achieved with an alignment laser positioned at the end of the row that emits a beam overlapping or parallel to the intended rotational axis and/or torque tube. If this beam is illuminated on a target that is properly adjusted in yaw, and X, an operator may make manual adjustments to achieve alignment in Y and Z by feathering the vertical and horizontal slides until the beam from the laser is centered on the target. It may, however, in some embodiments be possible to eliminate these manual alignment steps completely and rely instead on machine automation to achieve Y and Z alignment. To that end, FIGS. 15A-D detail a process for automatically aligning the mast in yaw, pitch, and X, using three range finding lasers that obviates the need to slide the mast vertically or horizontally to validate alignment.

Figure 15A:
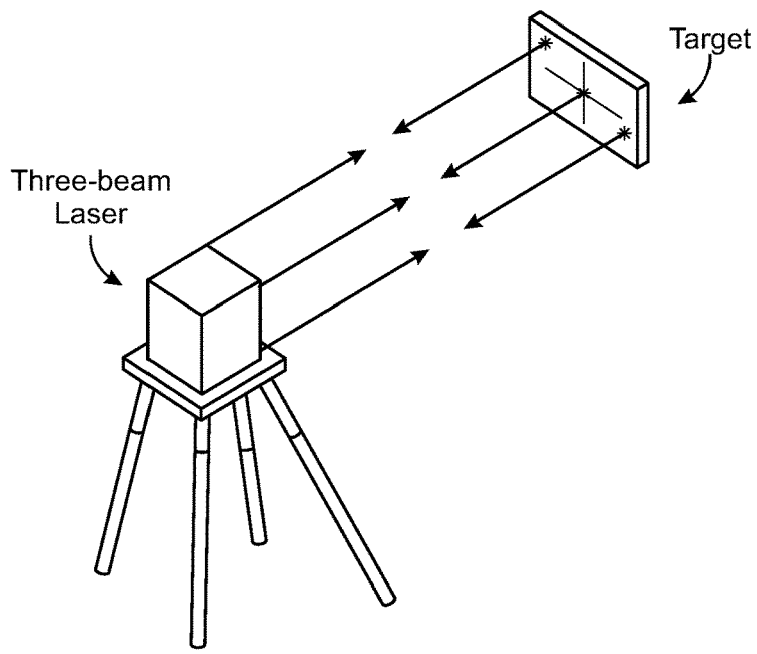
FIGS. 15A-D show steps of a method and components for performing a method of automated alignment of a mast of a foundation component driving machine according to various embodiments of the invention.

FIG. 15A shows the three-laser assembly mounted on a quad pod or a four-legged stand. Alternatively, another type of support may be used including one of the assembled truss foundations or H-piles in the intended tracker row. The laser assembly may be located at the end of a tracker row and may emit beams that are substantially parallel to and/or overlap with the intended rotational axis of the system. In various embodiments, the emitters of the laser assembly may be arranged in a diagonal row so as to impinge on the upper right, middle and lower left of the target, or vice versa. Other configurations are also possible as long as the measured ranges of the lasers to their respective points on the target are different unless it is normal to all three. All three lasers may also have adjacent spotting lasers that are in the visible spectrum so that the operator can confirm that they are impinging on the target. The spotting lasers indicate the focus of the range finding lasers but may also be used to align the mast in Y and Z by the operator.

Figure 15B:
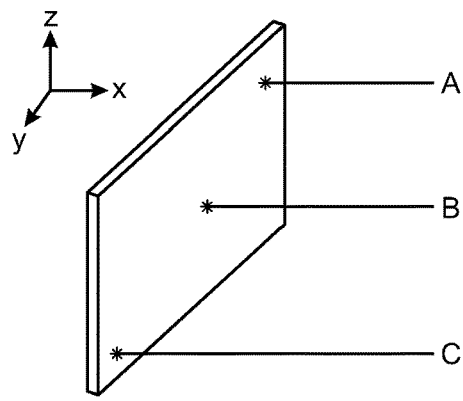

Starting with FIG. 15B, all three beams impinge on the target plate at different positions in Y and Z. Due to initial misalignment, the measured distances of all three may be different, with point A being the closest, then B and finally point C. By adjusting the X-slide, the mast and target may be moved until the reading at point B is equivalent to the desired X-direction location of the foundation. Then, the mast and target may be automatically adjusted until A increases and C decreases to equal B indicating that both pitch and yaw have been aligned. As discussed in the context of FIGS. 14A-E, yaw adjustments may be made automatically by the controller extending or retracting an actuator connected to a trunnion or other device and pitch adjustment may be made by the controller adjusting one or more the actuators that moves the mast to lean toward and away from the machine. Once yaw and pitch are aligned, Y and Z adjustments may be made based on the position of the spotting lasers on the target.

Figure 15C:
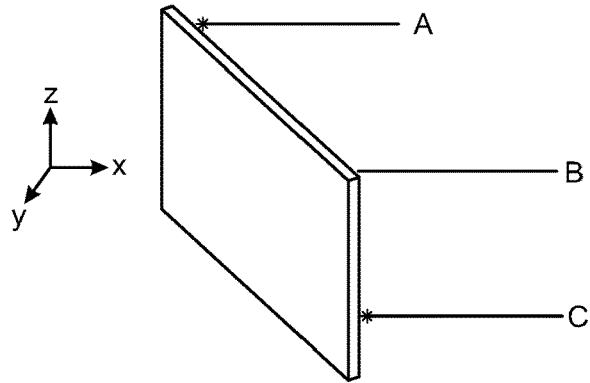
Figure 15D:
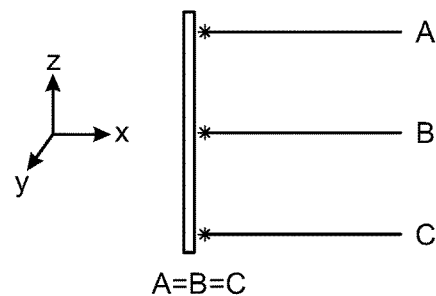

FIG. 15C shows the opposite misalignment case of FIG. 15B, where beam C impinges on the target at the closest point. In this case, the X-slide may be controlled to move the mast and target towards or away from the laser source until the measurement by laser B equals the desired distance. After or at the same time, the controller may control actuators to adjust the mast's attitude (pitch and yaw) to bring the distance measurements to A and C in line with B and shown in FIG. 15D. Again, manual feathering of the Z and Y slides may enable the operator to complete alignment in these directions using the spotting beam of laser B. FIG. 15D shows the case where all three are aligned, indicated that pitch and yaw are both correctly aligned as indicated by the distances measured by the three range finding lasers being equal.

Figure 16:
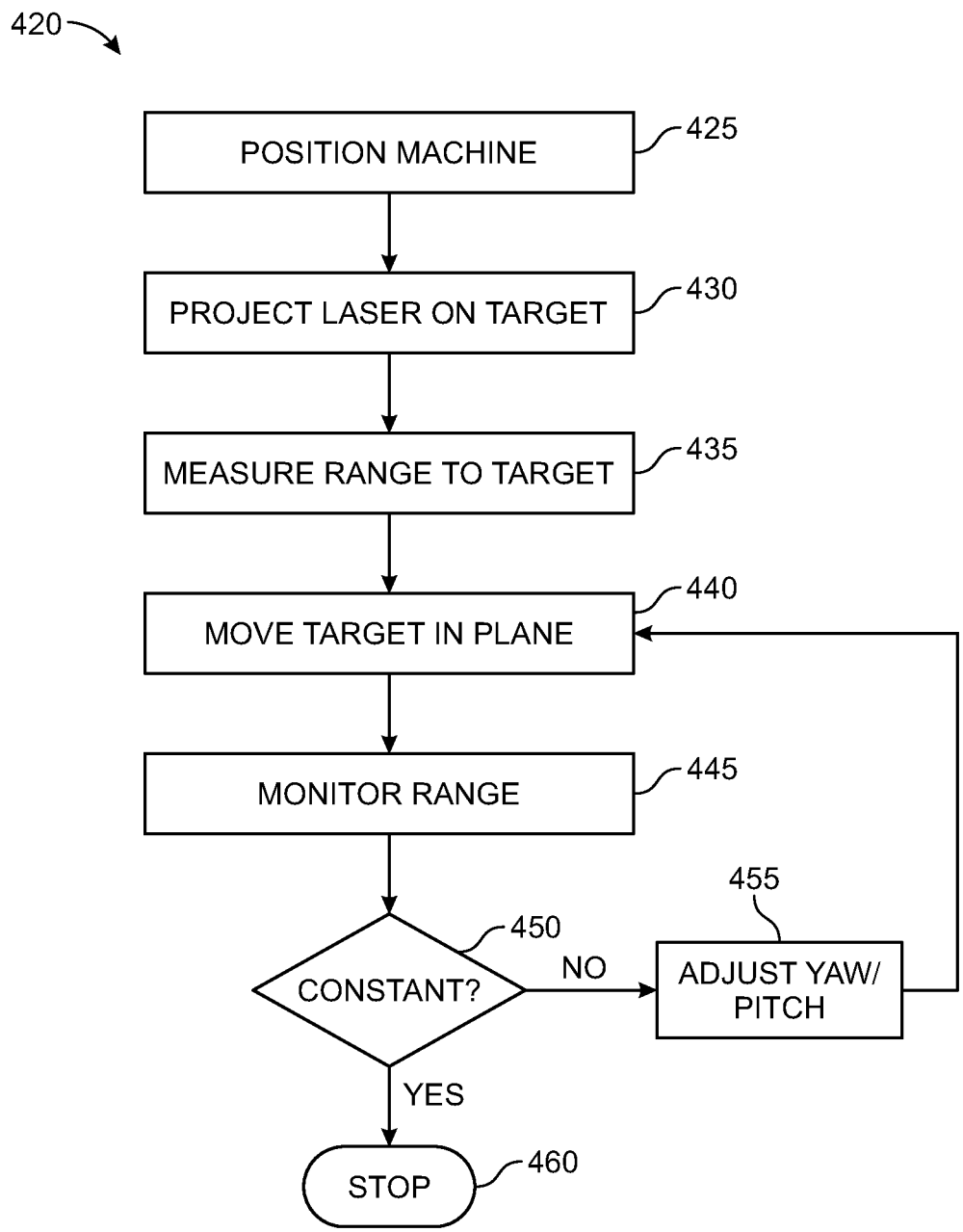
FIG. 16 is a flow chart detailing steps of a method of automated pitch and yaw alignment of a mast of a foundation component driving machine using a single range finding laser according to various embodiments of the invention.

Turning now to FIG. 16, this figure is a flow chart detailing the steps of method 420 for aligning the machine mast in yaw or pitch with a single range finding laser such as that shown and discussed in the context of FIGS. 14A-E. The method begins in step 425 with positioning the machine along the row proximate to the next foundation location. While this method is discussed in the context of installing truss foundations, the steps are equally applicable to installing H-pile foundations. This step may be performed manually or under the command of a control system such as that shown in FIGS. 4 and 13 with the assistance of a local positioning system to provide onsite positioning with respect to the row and foundation location to move the machine to the general location where the next foundation is to be installed. The accuracy of such systems is within the range of motion of the mast and therefore provides sufficient initial positioning to allow automated alignment to begin. Alternatively, there may be a flag or other survey marker in the ground to indicate where along the tracker row the foundation component(s) should be driven. Then, in step 430, a range finding laser positioned at the end of the row may be projected on a target positioned on the mast of the driving machine to indicate the distance between the laser and the illuminated portion of the target. In various embodiments, next, in step 435, this information is transmitted to a controller that controls control and sensor nodes corresponding to mast alignment. In step 440, if aligning in yaw, the controller may actuate a Y-direction slide to move the mast and target across the impinging beam. Alternatively, if adjusting pitch, in step 440 the controller may cause the Z-slide to move the mast in Z. During the adjustment, operation proceeds to step 445 where the range measurements received from the laser are monitored in real time. Next, in step 450, a determination is made by the controller whether the monitored measurements remain constant. If so, the controller concludes that the mast is aligned in yaw and/or pitch and operation will proceed to step 460 where it the method stops. Otherwise, if the monitored measurements do not remain constant, operation proceeds to step 455 where yaw or pitch are adjusted to compensate. The direction of compensation will depend on whether the measurements are increasing or decreasing. Compensation is effected by the controller actuating one or more of the control nodes to adjust yaw or pitch of the machine's mast. After adjustment, operation returns to step 440 where the target is again moved in plane. Operation continues iteratively between steps 440, 445, 450 and 455 until the measurements remain constant. This process may be also be used to measure pitch.

Figure 17:
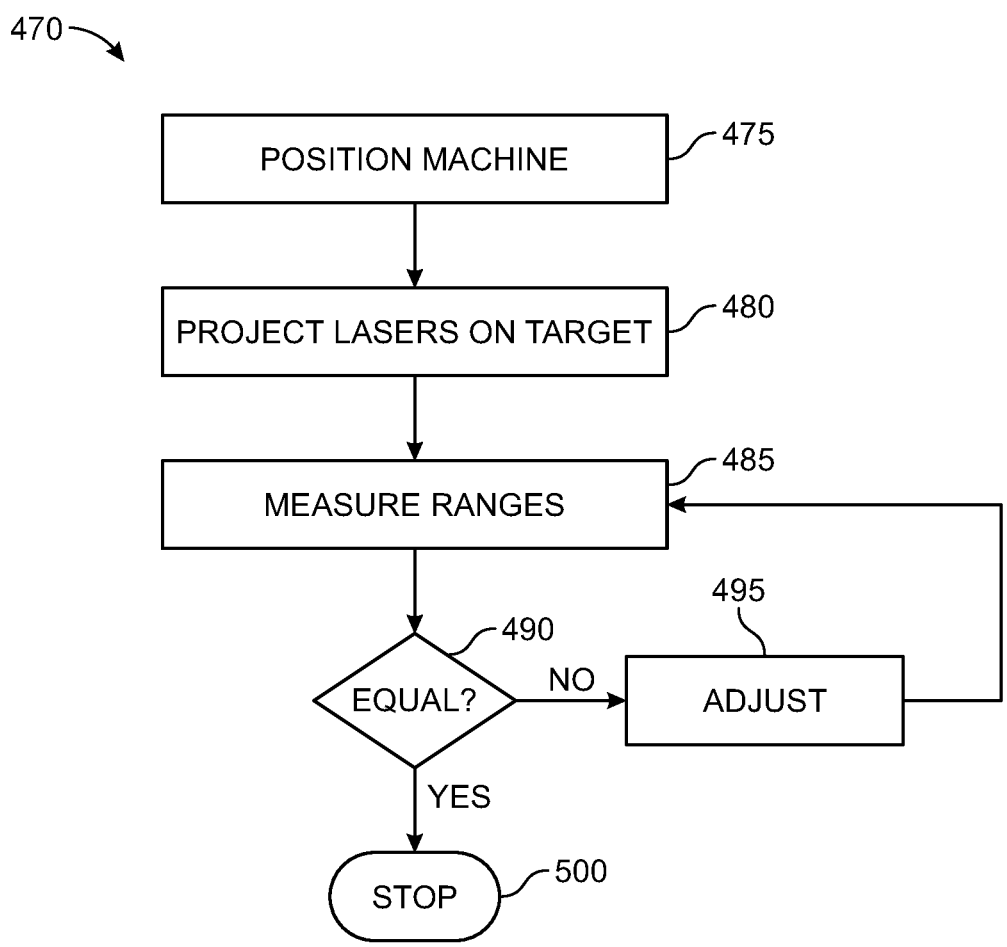
FIG. 17 is a flow chart detailing steps of a method of automated alignment of a mast of a foundation component driving machine using multiple range finding lasers according to various embodiments of the invention.

Turning now to FIG. 17, this figure shows a flow chart detailing the steps of method 470 of orienting the mast of a foundation driving machine with multiple lasers, such as that shown and discussed in the context of FIGS. 15A-D. The method begins in step 475 by positioning the machine on the tracker row proximate to the next foundation location. Again, positioning may occur manually or under the direction of the controller using a global or local positioning system, or combination of the two. Then, in step 480, multiple lasers or a single multiple laser assembly is placed at or proximate to the end of the row. The lasers are activated to project laser light on a reflective target on the machine's mast target. Next, in step 485, the reflected return signal of each laser is used to make three range measurements. In various embodiments, the range measurements are transmitted to the machine controller so that in step 490, the controller can determine whether or not they are equal. If so, operation proceeds to step 500 where operation stops. In addition, the mast may be moved in X if the measured distances are equal to one another but still less or greater than the expected distance. Otherwise, if they are not equal, operation may proceed to step 495 where the controller causes the mast and target to move with respect to the machine and the lasers, so the X-direction distance is equal to the desired X-direction distance and the other two readings are also equal to the first. As adjustment occurs, steps 485, 490, and 495 are repeated iteratively until the desired distance reading is consistently achieved. Once this alignment is complete, one or more spotting beams associated with the range finding laser may be used to manually orient the mast and target in the Y and Z directions.

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. In addition, methods disclosed herein need not be performed in the specific order shown in the figures. Accordingly, the claims set forth below should be construed in view of the full breath and spirit of the embodiments of the present inventions as disclosed herein.

The invention claimed is:

1. A method of orienting a machine to install foundation components for a single-axis tracker, the method comprising:
   locating a pair of reference points bounding opposing ends of a tracker row;
   projecting a first laser beam along a portion of the tracker row onto a target positioned on the machine, the first laser beam aligned with an intended rotational axis of the single-axis tracker;
   adjusting a portion of the machine containing the target in a first direction to align the first laser beam with the target; and
   measuring a distance between the first laser beam and the target based on laser light reflected off the target; and
   adjusting the portion of the machine containing the target in a second direction to make the measured distance equal a predetermined distance.

2. The method according to claim 1, further comprising driving a first foundation component into the ground after adjusting a portion of the machine in the first and second directions.

3. The method according to claim 2, wherein the first foundation component is an H-pile.

4. The method according to claim 2, wherein the first foundation component is a screw anchor.

5. The method according to claim 1, wherein adjusting the portion of the machine in the first direction comprises adjusting an orientation of the portion of the machine in Y, Z or yaw, where Y is a direction that is transverse to the first laser beam in the East-West direction, Z is vertically transverse to the first laser beam, and yaw is degree of orthogonality with respect to the laser beam.

6. The method according to claim 5, wherein adjusting the portion of the machine in the second direction comprises moving the portion of the machine along a direction of the laser beam.

7. A system for aligning a mast of a screw anchoring driving machine comprising:
 a first range finding laser oriented proximate to an end of an intended tracker row;
 a target attached to the mast of the machine; and
 a controller programmed to automatically adjust an orientation of the mast relative to the machine to achieve perpendicularity to a beam of the laser based on a measured distance received from the first range finding laser to the target that is communicated to the controller.

8. The system according to claim 7, wherein adjusting the orientation of the mast comprises moving the target and mast substantially horizontally across the beam and monitoring the distance measured by the first range finding laser for changes.

9. The system according to claim 8, wherein the controller is programmed to control the mast to adjust a yaw of the mast with respect to the beam about a drive axis of the mast until the measured distance remains constant.

10. The system according to claim 7, wherein adjusting the orientation of the mast comprises moving the target and mast substantially vertically across the beam and monitoring the distance measured by the range finding laser for changes.

11. The system according to claim 10, wherein the controller is programmed to control the mast to adjust a pitch of the mast with respect to the beam until the measured distance remains constant.

12. The system according to claim 7, further comprising at least one additional range finding laser positioned proximate to the first range finding laser.

13. The system according to claim 12, wherein the controller is programmed to adjust the orientation of the mast based on a comparison between measured distances received from the first range finding laser and the at least one additional range finding laser.

14. The system according to claim 12, wherein the controller is programmed to adjust a pitch and yaw of the mast to achieve perpendicularity with the first range finding laser and at least one second range finding laser until the measured distances are the same.

15. The system according to claim 14, wherein the controller is programmed to adjust a position of the mast so that the measured distances are equal and equivalent to a predetermined distance.

16. A system for orienting a foundation component driving machine comprising:
 an articulating mast attached to the machine;
 a foundation component driving system movably attached to the mast;
 a laser target mounted on the mast;
 a first range finding laser; and
 a controller, wherein the controller is operable to automatically adjust the mast to make the target substantially perpendicular to a beam of the range finding laser based on distance measurements to the target received from the first range finding laser.

17. The system according to claim 16, wherein the controller is operable to move the mast substantially horizontally across the beam of the first range finding laser and to adjust a yaw of the mast to make the target perpendicular to the beam if the distance measurements change.

18. The system according to claim 17, wherein the controller is operable to move the mast substantially vertically across the beam of the first range finding laser and to adjust a pitch of the mast to make the target perpendicular to the beam if the distance measurements change.

19. The system according to claim 18, wherein the controller is operable to adjust a position of the mast so that the distance measurements are equal and equivalent to a predetermined distance.

20. The system according to claim 16, further comprising a second range finding laser positioned proximate to the first range finding laser, wherein the controller is operable to adjust an orientation of the mast based on respective measured distances received from the first and second range finding lasers.

* * * * *